United States Patent
Miura et al.

(10) Patent No.: US 9,483,405 B2
(45) Date of Patent: Nov. 1, 2016

(54) SIMPLIFIED RUN-TIME PROGRAM TRANSLATION FOR EMULATING COMPLEX PROCESSOR PIPELINES

(75) Inventors: Victor O. S. Miura, Foster City, CA (US); Stewart Sargaison, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 1560 days.

(21) Appl. No.: 12/234,671

(22) Filed: Sep. 21, 2008

(65) Prior Publication Data

US 2009/0083513 A1    Mar. 26, 2009

Related U.S. Application Data

(60) Provisional application No. 60/973,994, filed on Sep. 20, 2007.

(51) Int. Cl.
*G06F 12/02* (2006.01)
*G06F 12/08* (2016.01)
*G06F 12/10* (2016.01)

(52) U.S. Cl.
CPC ....... *G06F 12/0855* (2013.01); *G06F 12/1009* (2013.01)

(58) Field of Classification Search
None
See application file for complete search history.

(56) References Cited

U.S. PATENT DOCUMENTS

| | | |
|---|---|---|
| 3,735,026 A | 5/1973 | Smith et al. |
| 4,367,458 A | 1/1983 | Hackett |
| 4,422,093 A | 12/1983 | Pargee, Jr. |
| 4,499,568 A | 2/1985 | Gremillet |
| 4,506,387 A | 3/1985 | Walter |
| 4,520,407 A | 5/1985 | Tanaka et al. |
| 4,569,015 A | 2/1986 | Dolev et al. |
| 4,727,422 A | 2/1988 | Hinman |
| 4,849,811 A | 7/1989 | Kleinerman |
| 4,897,717 A | 1/1990 | Hamilton et al. |
| 4,918,523 A | 4/1990 | Simon et al. |
| 4,949,187 A | 8/1990 | Cohen |
| 4,963,995 A | 10/1990 | Lang |
| 4,974,178 A | 11/1990 | Izeki et al. |
| 5,010,399 A | 4/1991 | Goodman et al. |
| 5,018,021 A | 5/1991 | Slater |

(Continued)

FOREIGN PATENT DOCUMENTS

| | | |
|---|---|---|
| BR | PI1002037-3 | 7/2011 |
| CN | 1371216 | 9/2002 |

(Continued)

OTHER PUBLICATIONS

"Brief for Appellants", In re Masayuki Chatani et al., U.S. Court of Appeals for the Federal Circuit (2007-1150) (Mar. 23, 2007).

(Continued)

*Primary Examiner* — Charles Rones
*Assistant Examiner* — Ryan Dare
(74) *Attorney, Agent, or Firm* — Carr & Ferrell LLP

(57) ABSTRACT

Simplification of run-time program translation for emulating complex processor pipelines is disclosed. Dynamic pipeline states are moved into a cache lookup process leaving a code translation process to deal only with static pipeline states. With dynamic pipeline states removed from the translation process, translation becomes more simple and efficient like that of a non-pipelined processor.

16 Claims, 6 Drawing Sheets

(56) References Cited

U.S. PATENT DOCUMENTS

| | | |
|---|---|---|
| 5,034,807 A | 7/1991 | Von Kohorn |
| 5,057,932 A | 10/1991 | Lang |
| 5,107,489 A | 4/1992 | Brown et al. |
| 5,119,483 A * | 6/1992 | Madden et al. ............ 714/15 |
| 5,121,261 A | 6/1992 | Isogai et al. |
| 5,132,992 A | 7/1992 | Yurt et al. |
| 5,164,839 A | 11/1992 | Lang |
| 5,187,787 A | 2/1993 | Skeen et al. |
| 5,193,180 A | 3/1993 | Hastings |
| 5,222,134 A | 6/1993 | Waite et al. |
| 5,233,423 A | 8/1993 | Jernigan et al. |
| 5,241,682 A | 8/1993 | Bryant et al. |
| 5,253,275 A | 10/1993 | Yurt et al. |
| 5,276,866 A | 1/1994 | Paolini |
| 5,313,467 A | 5/1994 | Varghese et al. |
| 5,315,326 A | 5/1994 | Sugiyama |
| 5,335,344 A | 8/1994 | Hastings |
| 5,339,392 A | 8/1994 | Risberg et al. |
| 5,341,477 A | 8/1994 | Pitkin et al. |
| 5,392,278 A | 2/1995 | Teel et al. |
| 5,416,779 A | 5/1995 | Barnes et al. |
| 5,436,653 A | 7/1995 | Ellis et al. |
| 5,481,178 A | 1/1996 | Wilcox et al. |
| 5,490,216 A | 2/1996 | Richardson, III |
| 5,504,894 A | 4/1996 | Ferguson et al. |
| 5,508,731 A | 4/1996 | Kohorn |
| 5,508,733 A | 4/1996 | Kassatly |
| 5,511,186 A | 4/1996 | Carhart et al. |
| 5,522,087 A | 5/1996 | Hsiang |
| 5,523,551 A | 6/1996 | Scott |
| 5,524,051 A | 6/1996 | Ryan |
| 5,532,735 A | 7/1996 | Blahut et al. |
| 5,535,329 A | 7/1996 | Hastings |
| 5,539,448 A | 7/1996 | Verhille et al. |
| 5,541,638 A | 7/1996 | Story |
| 5,543,591 A | 8/1996 | Gillespie et al. |
| 5,548,784 A | 8/1996 | Easley, Jr. et al. |
| 5,550,863 A | 8/1996 | Yurt et al. |
| 5,572,442 A | 11/1996 | Schulhof et al. |
| 5,586,261 A | 12/1996 | Brooks et al. |
| 5,590,195 A | 12/1996 | Ryan |
| 5,630,757 A | 5/1997 | Gagin et al. |
| 5,636,277 A | 6/1997 | Nagahama |
| 5,675,571 A | 10/1997 | Wilson |
| 5,680,619 A | 10/1997 | Gudmundson et al. |
| 5,682,139 A | 10/1997 | Pradeep et al. |
| 5,701,582 A | 12/1997 | DeBey |
| 5,704,032 A | 12/1997 | Badovinatz et al. |
| 5,719,937 A | 2/1998 | Warren et al. |
| 5,721,827 A | 2/1998 | Logan et al. |
| 5,737,311 A | 4/1998 | Wyld |
| 5,751,336 A | 5/1998 | Aggarwal et al. |
| 5,751,806 A | 5/1998 | Ryan |
| 5,764,158 A | 6/1998 | Franklin et al. |
| 5,767,913 A | 6/1998 | Kassatly |
| 5,778,187 A | 7/1998 | Monteiro et al. |
| 5,790,177 A | 8/1998 | Kassatly |
| 5,794,217 A | 8/1998 | Allen |
| 5,809,145 A | 9/1998 | Slik et al. |
| 5,809,450 A | 9/1998 | Chrysos et al. |
| 5,809,472 A | 9/1998 | Morrison |
| 5,815,671 A | 9/1998 | Morrison |
| 5,823,879 A | 10/1998 | Goldberg et al. |
| 5,826,085 A | 10/1998 | Bennett et al. |
| 5,831,662 A | 11/1998 | Payton |
| 5,835,701 A | 11/1998 | Hastings |
| 5,838,314 A | 11/1998 | Neel et al. |
| 5,838,909 A | 11/1998 | Roy et al. |
| 5,841,980 A | 11/1998 | Waters et al. |
| 5,845,265 A | 12/1998 | Woolston |
| 5,864,316 A | 1/1999 | Bradley et al. |
| 5,864,854 A | 1/1999 | Boyle |
| 5,867,494 A | 2/1999 | Krishnaswamy et al. |
| 5,879,236 A | 3/1999 | Lambright |
| 5,880,411 A | 3/1999 | Gillespie et al. |
| 5,892,536 A | 4/1999 | Logan et al. |
| 5,892,900 A | 4/1999 | Ginter et al. |
| 5,893,106 A | 4/1999 | Brobst et al. |
| 5,903,892 A | 5/1999 | Hoffert et al. |
| 5,913,040 A | 6/1999 | Rakavy et al. |
| 5,914,941 A | 6/1999 | Janky |
| 5,923,872 A | 7/1999 | Chrysos et al. |
| 5,924,068 A | 7/1999 | Richard et al. |
| 5,933,063 A | 8/1999 | Keung et al. |
| 5,933,603 A | 8/1999 | Vahalia et al. |
| 5,940,738 A | 8/1999 | Rao |
| 5,941,947 A | 8/1999 | Brown et al. |
| 5,956,485 A | 9/1999 | Perlman |
| 5,956,629 A | 9/1999 | Morrison |
| 5,960,196 A | 9/1999 | Carrier, III et al. |
| 5,963,202 A | 10/1999 | Polish |
| 5,964,867 A | 10/1999 | Anderson et al. |
| 5,983,176 A | 11/1999 | Hoffert et al. |
| 5,984,787 A | 11/1999 | Redpath |
| 5,986,692 A | 11/1999 | Logan et al. |
| 5,987,376 A | 11/1999 | Olson et al. |
| 5,987,525 A | 11/1999 | Roberts et al. |
| 5,995,705 A | 11/1999 | Lang |
| 6,000,044 A | 12/1999 | Chrysos et al. |
| 6,002,720 A | 12/1999 | Yurt et al. |
| 6,003,030 A | 12/1999 | Kenner et al. |
| 6,041,312 A | 3/2000 | Bickerton et al. |
| 6,041,329 A | 3/2000 | Kishi |
| 6,044,335 A | 3/2000 | Ksendzov |
| 6,049,539 A | 4/2000 | Lee et al. |
| 6,050,898 A | 4/2000 | Vange et al. |
| 6,057,845 A | 5/2000 | Dupouy |
| 6,061,504 A | 5/2000 | Tzelnic et al. |
| 6,066,182 A | 5/2000 | Wilde et al. |
| 6,067,278 A | 5/2000 | Owens et al. |
| 6,070,009 A | 5/2000 | Dean et al. |
| 6,070,141 A | 5/2000 | Houvener et al. |
| 6,073,123 A | 6/2000 | Staley |
| 6,081,785 A | 6/2000 | Oshima et al. |
| 6,085,176 A | 7/2000 | Woolston |
| 6,085,262 A | 7/2000 | Sawada |
| 6,088,455 A | 7/2000 | Logan et al. |
| 6,088,721 A | 7/2000 | Lin et al. |
| 6,092,180 A | 7/2000 | Anderson et al. |
| 6,105,098 A | 8/2000 | Ninose et al. |
| 6,105,099 A | 8/2000 | Freitas et al. |
| 6,106,569 A | 8/2000 | Bohrer et al. |
| 6,108,569 A | 8/2000 | Shen |
| 6,108,703 A | 8/2000 | Leighton et al. |
| 6,117,011 A | 9/2000 | Lvov |
| 6,119,075 A | 9/2000 | Dean et al. |
| 6,119,108 A | 9/2000 | Holmes et al. |
| 6,135,646 A | 10/2000 | Kahn et al. |
| 6,137,480 A | 10/2000 | Shintani |
| 6,142,472 A | 11/2000 | Kliebisch |
| 6,144,702 A | 11/2000 | Yurt et al. |
| 6,148,335 A | 11/2000 | Haggard et al. |
| 6,148,396 A | 11/2000 | Chrysos et al. |
| 6,152,824 A | 11/2000 | Rothschild et al. |
| 6,154,773 A | 11/2000 | Roberts et al. |
| 6,154,782 A | 11/2000 | Kawaguchi et al. |
| 6,157,955 A | 12/2000 | Narad et al. |
| 6,161,132 A | 12/2000 | Roberts et al. |
| 6,163,692 A | 12/2000 | Chakrabarti et al. |
| 6,163,840 A | 12/2000 | Chrysos et al. |
| 6,173,322 B1 | 1/2001 | Hu |
| 6,175,814 B1 | 1/2001 | Chrysos et al. |
| 6,178,160 B1 | 1/2001 | Bolton et al. |
| 6,185,532 B1 | 2/2001 | Lemaire et al. |
| 6,189,146 B1 | 2/2001 | Misra et al. |
| 6,192,340 B1 | 2/2001 | Abecassis |
| 6,195,432 B1 | 2/2001 | Takahashi et al. |
| 6,195,748 B1 | 2/2001 | Chrysos et al. |
| 6,199,076 B1 | 3/2001 | Logan et al. |
| 6,199,110 B1 | 3/2001 | Rizvi et al. |
| 6,201,771 B1 | 3/2001 | Otsuka et al. |
| 6,202,051 B1 | 3/2001 | Woolston |
| 6,203,433 B1 | 3/2001 | Kume |
| 6,206,584 B1 | 3/2001 | Hastings |

(56) References Cited

U.S. PATENT DOCUMENTS

| | | |
|---|---|---|
| 6,212,521 B1 | 4/2001 | Minami et al. |
| 6,219,045 B1 | 4/2001 | Leahy et al. |
| 6,230,192 B1 | 5/2001 | Roberts et al. |
| 6,230,207 B1 | 5/2001 | Roberts et al. |
| 6,233,633 B1 | 5/2001 | Douma |
| 6,237,073 B1 | 5/2001 | Dean et al. |
| 6,240,459 B1 | 5/2001 | Roberts et al. |
| 6,246,672 B1 | 6/2001 | Lumelsky |
| 6,247,017 B1 | 6/2001 | Martin |
| 6,247,131 B1 | 6/2001 | Kotani et al. |
| 6,253,237 B1 | 6/2001 | Story et al. |
| 6,260,141 B1 | 7/2001 | Park |
| 6,262,777 B1 | 7/2001 | Brewer et al. |
| 6,263,433 B1 | 7/2001 | Robinson et al. |
| 6,266,651 B1 | 7/2001 | Woolston |
| 6,282,549 B1 | 8/2001 | Hoffert et al. |
| 6,292,940 B1 | 9/2001 | Sato |
| 6,300,880 B1 | 10/2001 | Sitnik |
| 6,311,209 B1 | 10/2001 | Olson et al. |
| 6,314,451 B1 | 11/2001 | Landsman et al. |
| 6,327,624 B1 | 12/2001 | Mathewson, II et al. |
| 6,330,593 B1 | 12/2001 | Roberts et al. |
| 6,339,591 B1 | 1/2002 | Migimatsu |
| 6,345,297 B1 | 2/2002 | Grimm et al. |
| 6,352,479 B1 | 3/2002 | Sparks, II |
| 6,360,266 B1 | 3/2002 | Pettus |
| 6,360,275 B1 | 3/2002 | Chu et al. |
| 6,363,416 B1 | 3/2002 | Naeimi et al. |
| 6,370,543 B2 | 4/2002 | Hoffert et al. |
| 6,393,430 B1 | 5/2002 | Van Ryzin |
| 6,400,996 B1 | 6/2002 | Hoffberg et al. |
| 6,405,203 B1 | 6/2002 | Collart |
| 6,407,750 B1 | 6/2002 | Gioscia et al. |
| 6,421,717 B1 | 7/2002 | Kloba et al. |
| 6,421,726 B1 | 7/2002 | Kenner et al. |
| 6,421,728 B1 | 7/2002 | Mohammed et al. |
| 6,434,535 B1 | 8/2002 | Kupka et al. |
| 6,446,080 B1 | 9/2002 | Van Ryzin et al. |
| 6,446,260 B1 | 9/2002 | Wilde et al. |
| 6,449,226 B1 | 9/2002 | Kumagai |
| 6,453,252 B1 | 9/2002 | Laroche |
| 6,460,076 B1 | 10/2002 | Srinivasan |
| 6,463,078 B1 | 10/2002 | Engstrom et al. |
| 6,470,085 B1 | 10/2002 | Uranaka et al. |
| 6,484,221 B1 | 11/2002 | Lorinser et al. |
| 6,487,583 B1 | 11/2002 | Harvey et al. |
| 6,487,678 B1 | 11/2002 | Briskey et al. |
| 6,496,826 B1 | 12/2002 | Chowdhury et al. |
| 6,502,125 B1 | 12/2002 | Kenner et al. |
| 6,502,139 B1 | 12/2002 | Birk et al. |
| 6,505,342 B1 | 1/2003 | Hartmann et al. |
| 6,516,393 B1 * | 2/2003 | Fee et al. ............... 711/150 |
| 6,519,629 B2 | 2/2003 | Harvey et al. |
| 6,529,453 B1 | 3/2003 | Otsuka et al. |
| 6,530,840 B1 | 3/2003 | Cuomo et al. |
| 6,539,424 B1 | 3/2003 | Dutta |
| 6,546,448 B1 | 4/2003 | Lai et al. |
| 6,549,930 B1 | 4/2003 | Chrysos et al. |
| 6,549,946 B1 | 4/2003 | Fisher et al. |
| 6,553,003 B1 | 4/2003 | Chang |
| 6,553,030 B2 | 4/2003 | Ku et al. |
| 6,553,413 B1 | 4/2003 | Leighton et al. |
| 6,560,636 B2 | 5/2003 | Cohen et al. |
| 6,560,640 B2 | 5/2003 | Smethers |
| 6,561,811 B2 | 5/2003 | Rapoza et al. |
| 6,564,336 B1 | 5/2003 | Majkowski |
| 6,574,234 B1 | 6/2003 | Myer et al. |
| 6,582,310 B1 | 6/2003 | Walker et al. |
| 6,587,874 B1 | 7/2003 | Golla et al. |
| 6,594,740 B1 | 7/2003 | Fukuda |
| 6,598,164 B1 | 7/2003 | Shepard |
| 6,605,342 B1 | 8/2003 | Burghaus et al. |
| 6,607,444 B2 | 8/2003 | Takahashi et al. |
| 6,610,936 B2 | 8/2003 | Gillespie et al. |
| 6,611,607 B1 | 8/2003 | Davis et al. |
| 6,618,824 B1 | 9/2003 | Hastings |
| 6,622,305 B1 | 9/2003 | Willard |
| 6,623,360 B1 | 9/2003 | Nakajima |
| 6,625,152 B1 | 9/2003 | Monsen et al. |
| 6,625,722 B1 | 9/2003 | Lancaster |
| 6,631,412 B1 | 10/2003 | Glasser et al. |
| 6,637,031 B1 | 10/2003 | Chou |
| 6,640,306 B1 | 10/2003 | Tone et al. |
| 6,661,430 B1 | 12/2003 | Brewer et al. |
| 6,665,706 B2 | 12/2003 | Kenner et al. |
| 6,671,358 B1 | 12/2003 | Siedman et al. |
| 6,676,521 B1 | 1/2004 | La Mura et al. |
| 6,681,000 B1 | 1/2004 | Moriguchi et al. |
| 6,687,817 B1 | 2/2004 | Paul |
| 6,687,908 B1 | 2/2004 | Santilli |
| 6,694,025 B1 | 2/2004 | Epstein et al. |
| 6,701,344 B1 | 3/2004 | Holt et al. |
| 6,701,420 B1 | 3/2004 | Hamilton et al. |
| 6,701,528 B1 | 3/2004 | Arsenault et al. |
| 6,714,966 B1 | 3/2004 | Holt et al. |
| 6,718,264 B2 | 4/2004 | Takahashi |
| 6,728,949 B1 | 4/2004 | Bryant et al. |
| 6,732,147 B1 | 5/2004 | Holt et al. |
| 6,738,983 B1 | 5/2004 | Rao et al. |
| 6,748,420 B1 | 6/2004 | Quatrano et al. |
| 6,750,852 B2 | 6/2004 | Gillespie et al. |
| 6,754,233 B1 | 6/2004 | Henderson et al. |
| 6,754,845 B2 | 6/2004 | Kursawe et al. |
| 6,756,783 B2 | 6/2004 | Brune et al. |
| 6,757,543 B2 | 6/2004 | Moran et al. |
| 6,761,636 B2 | 7/2004 | Chung et al. |
| 6,763,371 B1 | 7/2004 | Jandel |
| 6,763,392 B1 | 7/2004 | del Val et al. |
| 6,782,421 B1 | 8/2004 | Soles et al. |
| 6,799,255 B1 | 9/2004 | Blumenau et al. |
| 6,801,930 B1 | 10/2004 | Dionne et al. |
| 6,804,825 B1 | 10/2004 | White et al. |
| 6,811,488 B2 | 11/2004 | Paravia et al. |
| 6,829,634 B1 | 12/2004 | Holt et al. |
| 6,832,318 B1 | 12/2004 | Yaegashi et al. |
| 6,850,252 B1 | 2/2005 | Hoffberg |
| 6,892,064 B2 | 5/2005 | Qi et al. |
| 6,910,069 B1 | 6/2005 | Holt et al. |
| 6,920,497 B1 | 7/2005 | Bourassa et al. |
| 6,920,565 B2 | 7/2005 | Isaacson et al. |
| 6,925,636 B2 | 8/2005 | Haugen et al. |
| 6,931,446 B1 | 8/2005 | Cox et al. |
| 6,963,964 B2 * | 11/2005 | Luick ............... 711/210 |
| 6,987,221 B2 | 1/2006 | Platt |
| 6,987,813 B1 | 1/2006 | Demetrescu et al. |
| 6,990,338 B2 | 1/2006 | Miller et al. |
| 7,003,550 B1 | 2/2006 | Cleasby et al. |
| 7,006,881 B1 | 2/2006 | Hoffberg et al. |
| 7,010,783 B2 | 3/2006 | de Jong |
| 7,012,999 B2 | 3/2006 | Ruckart |
| 7,016,942 B1 | 3/2006 | Odom |
| 7,018,295 B2 | 3/2006 | Sakaguchi et al. |
| 7,025,675 B2 | 4/2006 | Fogel et al. |
| 7,027,773 B1 | 4/2006 | McMillin |
| 7,055,067 B2 | 5/2006 | DiJoseph |
| 7,056,217 B1 | 6/2006 | Pelkey et al. |
| 7,058,376 B2 | 6/2006 | Logan et al. |
| 7,064,796 B2 | 6/2006 | Roy et al. |
| 7,075,919 B1 | 7/2006 | Wendt et al. |
| 7,076,475 B2 | 7/2006 | Honarvar |
| 7,093,007 B2 | 8/2006 | Patton et al. |
| 7,100,047 B2 | 8/2006 | Stamos et al. |
| 7,107,312 B2 | 9/2006 | Hackbarth et al. |
| 7,127,737 B1 | 10/2006 | Bayrakeri et al. |
| 7,155,735 B1 | 12/2006 | Ngo et al. |
| 7,177,950 B2 | 2/2007 | Narayan et al. |
| 7,181,494 B2 | 2/2007 | Lavoie et al. |
| 7,188,331 B2 | 3/2007 | Culter |
| 7,233,948 B1 | 6/2007 | Shamoon et al. |
| 7,257,623 B2 | 8/2007 | Viavant et al. |
| 7,266,771 B1 | 9/2007 | Tow et al. |
| 7,280,519 B1 | 10/2007 | Shane |
| 7,290,264 B1 | 10/2007 | Powers et al. |
| 7,305,170 B2 | 12/2007 | Okada et al. |

(56) References Cited

U.S. PATENT DOCUMENTS

| | | |
|---|---|---|
| 7,305,431 B2 | 12/2007 | Karnik et al. |
| 7,308,080 B1 | 12/2007 | Moriuchi et al. |
| 7,313,810 B1 | 12/2007 | Bell et al. |
| 7,320,131 B1 | 1/2008 | O'Toole, Jr. |
| 7,333,864 B1 | 2/2008 | Herley |
| 7,343,141 B2 | 3/2008 | Ellis et al. |
| 7,359,979 B2 | 4/2008 | Gentle et al. |
| 7,466,823 B2 | 12/2008 | Vestergaard et al. |
| 7,475,219 B2 * | 1/2009 | O'Connor et al. ........... 711/202 |
| 7,574,488 B2 | 8/2009 | Matsubara |
| 7,587,465 B1 | 9/2009 | Muchow |
| 7,613,633 B1 | 11/2009 | Woolston |
| 7,657,879 B1 | 2/2010 | Zalewski |
| 7,706,901 B2 | 4/2010 | Berreth |
| 7,711,847 B2 | 5/2010 | Dhupelia et al. |
| 7,716,238 B2 | 5/2010 | Harris |
| 7,720,908 B1 | 5/2010 | Newson et al. |
| 7,730,206 B2 | 6/2010 | Newson et al. |
| 7,792,902 B2 | 9/2010 | Chatani et al. |
| 7,822,809 B2 | 10/2010 | Dhupelia et al. |
| 7,831,666 B2 | 11/2010 | Chatani et al. |
| 7,908,362 B2 | 3/2011 | Ferguson et al. |
| 8,126,987 B2 | 2/2012 | Chopra et al. |
| 8,239,446 B2 | 8/2012 | Navar et al. |
| 8,433,759 B2 | 4/2013 | Styles et al. |
| 8,458,754 B2 | 6/2013 | Corson |
| 8,666,524 B2 | 3/2014 | Ben-Yaacov et al. |
| 8,966,557 B2 | 2/2015 | Corson |
| 2001/0007981 A1 | 7/2001 | Woolston |
| 2001/0009868 A1 | 7/2001 | Sakaguchi et al. |
| 2001/0014891 A1 | 8/2001 | Hoffert et al. |
| 2001/0020295 A1 | 9/2001 | Satoh |
| 2001/0021999 A1 | 9/2001 | Seifert |
| 2001/0025256 A1 | 9/2001 | Oliphant et al. |
| 2001/0027561 A1 | 10/2001 | White et al. |
| 2001/0027563 A1 | 10/2001 | White et al. |
| 2001/0034721 A1 | 10/2001 | Boudreau et al. |
| 2001/0037466 A1 | 11/2001 | Fukutake et al. |
| 2001/0042021 A1 | 11/2001 | Matsuo et al. |
| 2001/0044339 A1 | 11/2001 | Cordero et al. |
| 2001/0051996 A1 | 12/2001 | Cooper et al. |
| 2002/0002076 A1 | 1/2002 | Schneier et al. |
| 2002/0016922 A1 | 2/2002 | Richards et al. |
| 2002/0035604 A1 | 3/2002 | Cohen et al. |
| 2002/0037699 A1 | 3/2002 | Kobayashi et al. |
| 2002/0041584 A1 | 4/2002 | Sashihara |
| 2002/0042830 A1 | 4/2002 | Bose et al. |
| 2002/0046232 A1 | 4/2002 | Adams et al. |
| 2002/0049086 A1 | 4/2002 | Otsu |
| 2002/0052816 A1 | 5/2002 | Clenaghan et al. |
| 2002/0060994 A1 | 5/2002 | Kovacs et al. |
| 2002/0062348 A1 | 5/2002 | Maehiro |
| 2002/0075844 A1 | 6/2002 | Hagen |
| 2002/0076084 A1 | 6/2002 | Tian et al. |
| 2002/0077988 A1 | 6/2002 | Sasaki et al. |
| 2002/0078376 A1 | 6/2002 | Miyoshi et al. |
| 2002/0082065 A1 | 6/2002 | Fogel et al. |
| 2002/0082077 A1 | 6/2002 | Johnson et al. |
| 2002/0082997 A1 | 6/2002 | Kobata et al. |
| 2002/0103855 A1 | 8/2002 | Chatani |
| 2002/0104019 A1 | 8/2002 | Chatani et al. |
| 2002/0114455 A1 | 8/2002 | Asahi et al. |
| 2002/0115488 A1 | 8/2002 | Berry et al. |
| 2002/0116206 A1 | 8/2002 | Chatani |
| 2002/0116275 A1 | 8/2002 | Woolston |
| 2002/0116283 A1 | 8/2002 | Chatani |
| 2002/0116471 A1 | 8/2002 | Shteyn |
| 2002/0116479 A1 | 8/2002 | Ishida et al. |
| 2002/0120925 A1 | 8/2002 | Logan |
| 2002/0122052 A1 | 9/2002 | Reich et al. |
| 2002/0129094 A1 | 9/2002 | Reisman |
| 2002/0133707 A1 | 9/2002 | Newcombe |
| 2002/0141338 A1 | 10/2002 | Burke |
| 2002/0143781 A1 | 10/2002 | Lavoie et al. |
| 2002/0147979 A1 | 10/2002 | Corson |
| 2002/0161709 A1 | 10/2002 | Floyd et al. |
| 2002/0188360 A1 | 12/2002 | Muramori et al. |
| 2002/0196940 A1 | 12/2002 | Isaacson et al. |
| 2002/0198929 A1 | 12/2002 | Jones et al. |
| 2002/0198930 A1 | 12/2002 | Jones et al. |
| 2003/0014759 A1 | 1/2003 | Van Stam |
| 2003/0018719 A1 | 1/2003 | Ruths et al. |
| 2003/0018797 A1 | 1/2003 | Dunning et al. |
| 2003/0023910 A1 | 1/2003 | Myler et al. |
| 2003/0032486 A1 | 2/2003 | Elliott |
| 2003/0037033 A1 | 2/2003 | Nyman et al. |
| 2003/0037150 A1 | 2/2003 | Nakagawa |
| 2003/0055892 A1 | 3/2003 | Huitema et al. |
| 2003/0073494 A1 | 4/2003 | Kalpakian et al. |
| 2003/0074456 A1 | 4/2003 | Yeung et al. |
| 2003/0076842 A1 | 4/2003 | Johansson et al. |
| 2003/0119537 A1 | 6/2003 | Haddad |
| 2003/0121043 A1 | 6/2003 | Reinold et al. |
| 2003/0131251 A1 | 7/2003 | Fetkovich |
| 2003/0135513 A1 | 7/2003 | Quinn et al. |
| 2003/0142661 A1 | 7/2003 | Chatani |
| 2003/0152034 A1 | 8/2003 | Zhang et al. |
| 2003/0189587 A1 | 10/2003 | White et al. |
| 2003/0190960 A1 | 10/2003 | Jokipii et al. |
| 2003/0206597 A1 | 11/2003 | Kolarov et al. |
| 2003/0208621 A1 | 11/2003 | Bowman |
| 2003/0216824 A1 | 11/2003 | Chu et al. |
| 2003/0217135 A1 | 11/2003 | Chatani et al. |
| 2003/0217158 A1 | 11/2003 | Datta |
| 2003/0237097 A1 | 12/2003 | Marshall et al. |
| 2004/0003039 A1 | 1/2004 | Humphrey et al. |
| 2004/0024879 A1 | 2/2004 | Dingman et al. |
| 2004/0030787 A1 | 2/2004 | Jandel et al. |
| 2004/0034536 A1 | 2/2004 | Hughes |
| 2004/0034691 A1 | 2/2004 | Tanimoto |
| 2004/0049086 A1 | 3/2004 | Muragaki et al. |
| 2004/0049392 A1 | 3/2004 | Yamada |
| 2004/0053690 A1 | 3/2004 | Fogel et al. |
| 2004/0057348 A1 | 3/2004 | Shteyn et al. |
| 2004/0059711 A1 | 3/2004 | Jandel et al. |
| 2004/0063458 A1 | 4/2004 | Hori et al. |
| 2004/0078369 A1 | 4/2004 | Rothstein et al. |
| 2004/0105401 A1 | 6/2004 | Lee |
| 2004/0107217 A1 | 6/2004 | Hastings |
| 2004/0111141 A1 | 6/2004 | Brabec et al. |
| 2004/0117443 A1 | 6/2004 | Barsness |
| 2004/0123306 A1 | 6/2004 | Gazda et al. |
| 2004/0131255 A1 | 7/2004 | Ben-Yaacov et al. |
| 2004/0133512 A1 | 7/2004 | Woolston |
| 2004/0139228 A1 | 7/2004 | Takeda et al. |
| 2004/0148344 A1 | 7/2004 | Navar et al. |
| 2004/0160943 A1 | 8/2004 | Cain |
| 2004/0162059 A1 | 8/2004 | Hiltunen et al. |
| 2004/0172476 A1 | 9/2004 | Chapweske |
| 2004/0216125 A1 | 10/2004 | Gazda et al. |
| 2004/0233855 A1 | 11/2004 | Gutierrez et al. |
| 2004/0240457 A1 | 12/2004 | Habetha et al. |
| 2004/0266336 A1 | 12/2004 | Patsiokas et al. |
| 2005/0018312 A1 | 1/2005 | Gruner et al. |
| 2005/0021398 A1 | 1/2005 | McCleskey et al. |
| 2005/0021470 A1 | 1/2005 | Martin et al. |
| 2005/0028197 A1 | 2/2005 | White et al. |
| 2005/0033655 A1 | 2/2005 | Woolston |
| 2005/0034162 A1 | 2/2005 | White et al. |
| 2005/0036616 A1 | 2/2005 | Huang et al. |
| 2005/0044568 A1 | 2/2005 | White et al. |
| 2005/0066219 A1 | 3/2005 | Hoffman et al. |
| 2005/0066358 A1 | 3/2005 | Anderson et al. |
| 2005/0071807 A1 | 3/2005 | Yanavi |
| 2005/0076379 A1 | 4/2005 | White et al. |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |
| 2005/0091359 A1 | 4/2005 | Soin et al. |
| 2005/0093868 A1 | 5/2005 | Hinckley |
| 2005/0097386 A1 | 5/2005 | Datta et al. |
| 2005/0100022 A1 | 5/2005 | Ramprashad |

(56) References Cited

U.S. PATENT DOCUMENTS

| | | |
|---|---|---|
| 2005/0105526 A1 | 5/2005 | Stiemerling et al. |
| 2005/0157749 A1 | 7/2005 | Lee et al. |
| 2005/0182937 A1 | 8/2005 | Bedi |
| 2005/0183127 A1 | 8/2005 | Ngo et al. |
| 2005/0188373 A1 | 8/2005 | Inoue |
| 2005/0198296 A1 | 9/2005 | Teodosiu et al. |
| 2005/0198388 A1 | 9/2005 | Teodosiu et al. |
| 2005/0240897 A1* | 10/2005 | Kailas ............................ 717/100 |
| 2005/0251577 A1 | 11/2005 | Guo et al. |
| 2005/0254366 A1 | 11/2005 | Amar |
| 2005/0259637 A1 | 11/2005 | Chu et al. |
| 2005/0262411 A1 | 11/2005 | Vertes et al. |
| 2005/0286426 A1 | 12/2005 | Padhye et al. |
| 2006/0075127 A1 | 4/2006 | Juncker et al. |
| 2006/0089163 A1 | 4/2006 | Khawand et al. |
| 2006/0100020 A1 | 5/2006 | Kasai |
| 2006/0123053 A1 | 6/2006 | Scannell, Jr. |
| 2006/0133328 A1 | 6/2006 | Levendel |
| 2006/0143650 A1 | 6/2006 | Tanikawa et al. |
| 2006/0146704 A1 | 7/2006 | Ozer et al. |
| 2006/0177139 A1 | 8/2006 | Marcellin et al. |
| 2006/0195748 A1 | 8/2006 | Chen et al. |
| 2006/0227372 A1 | 10/2006 | Takayanagi |
| 2006/0247011 A1 | 11/2006 | Gagner |
| 2006/0253595 A1 | 11/2006 | Datta |
| 2006/0256210 A1 | 11/2006 | Ryall et al. |
| 2006/0259604 A1 | 11/2006 | Kotchavi et al. |
| 2006/0271767 A1* | 11/2006 | Osanai et al. ................. 712/216 |
| 2006/0277541 A1 | 12/2006 | Sproul et al. |
| 2006/0288103 A1 | 12/2006 | Gobara et al. |
| 2006/0288394 A1 | 12/2006 | Thomas et al. |
| 2007/0010261 A1 | 1/2007 | Dravida et al. |
| 2007/0046669 A1 | 3/2007 | Choi et al. |
| 2007/0047912 A1 | 3/2007 | Hattori et al. |
| 2007/0058792 A1 | 3/2007 | Chaudhari et al. |
| 2007/0061460 A1 | 3/2007 | Khan et al. |
| 2007/0076729 A1 | 4/2007 | Takeda |
| 2007/0078002 A1 | 4/2007 | Evans et al. |
| 2007/0078706 A1 | 4/2007 | Datta et al. |
| 2007/0082674 A1 | 4/2007 | Pedersen et al. |
| 2007/0086033 A1 | 4/2007 | Tu |
| 2007/0096283 A1 | 5/2007 | Ljung et al. |
| 2007/0097959 A1 | 5/2007 | Taylor |
| 2007/0101369 A1 | 5/2007 | Dolph |
| 2007/0118281 A1 | 5/2007 | Adam et al. |
| 2007/0146347 A1 | 6/2007 | Rosenberg |
| 2007/0165629 A1 | 7/2007 | Chaturvedi et al. |
| 2007/0191109 A1 | 8/2007 | Crowder et al. |
| 2007/0192382 A1 | 8/2007 | Harris |
| 2007/0198528 A1 | 8/2007 | Harris |
| 2007/0208748 A1 | 9/2007 | Li |
| 2007/0217436 A1 | 9/2007 | Markley et al. |
| 2007/0259650 A1 | 11/2007 | Felder |
| 2007/0265089 A1 | 11/2007 | Robarts et al. |
| 2008/0010293 A1 | 1/2008 | Zpevak et al. |
| 2008/0013724 A1 | 1/2008 | Shamoon et al. |
| 2008/0016507 A1 | 1/2008 | Thomas et al. |
| 2008/0018652 A1* | 1/2008 | Toelle et al. .................. 345/506 |
| 2008/0044162 A1 | 2/2008 | Okada et al. |
| 2008/0046266 A1 | 2/2008 | Gudipalley et al. |
| 2008/0102947 A1 | 5/2008 | Hays et al. |
| 2008/0119286 A1 | 5/2008 | Brunstetter et al. |
| 2008/0152263 A1 | 6/2008 | Harrison |
| 2008/0153517 A1 | 6/2008 | Lee |
| 2008/0154401 A1 | 6/2008 | Wang |
| 2008/0180401 A1 | 7/2008 | Khedouri et al. |
| 2008/0208667 A1 | 8/2008 | Lymbery et al. |
| 2008/0259042 A1 | 10/2008 | Thorn |
| 2008/0261697 A1 | 10/2008 | Chatani |
| 2008/0280686 A1 | 11/2008 | Dhupelia et al. |
| 2008/0301318 A1 | 12/2008 | McCue et al. |
| 2008/0307103 A1 | 12/2008 | Marr et al. |
| 2008/0307412 A1 | 12/2008 | Marr et al. |
| 2009/0011835 A1 | 1/2009 | Hansen et al. |
| 2009/0070842 A1 | 3/2009 | Corson |
| 2009/0075634 A1 | 3/2009 | Sinclair et al. |
| 2009/0077245 A1 | 3/2009 | Smelyansky et al. |
| 2009/0100454 A1 | 4/2009 | Weber |
| 2009/0138610 A1 | 5/2009 | Gobara et al. |
| 2009/0150525 A1 | 6/2009 | Edgett et al. |
| 2009/0240821 A1 | 9/2009 | Juncker et al. |
| 2009/0315766 A1 | 12/2009 | Khosravy et al. |
| 2010/0083189 A1 | 4/2010 | Arlein et al. |
| 2010/0113066 A1 | 5/2010 | Dingler et al. |
| 2010/0156812 A1 | 6/2010 | Stallings et al. |
| 2010/0161496 A1 | 6/2010 | Zalewski |
| 2010/0188353 A1 | 7/2010 | Yoon et al. |
| 2010/0273452 A1 | 10/2010 | Rajann et al. |
| 2010/0293072 A1 | 11/2010 | Murrant |
| 2011/0010545 A1 | 1/2011 | Kill et al. |
| 2011/0047598 A1 | 2/2011 | Lindley et al. |
| 2011/0119345 A1 | 5/2011 | Chopra et al. |
| 2011/0161856 A1 | 6/2011 | Nurmi et al. |
| 2011/0289147 A1 | 11/2011 | Styles et al. |

FOREIGN PATENT DOCUMENTS

| | | |
|---|---|---|
| CN | 1717674 A | 1/2006 |
| CN | ZL02102091.4 | 6/2007 |
| CN | 101894577 | 11/2010 |
| CN | 103003810 | 3/2013 |
| CN | 103744473 | 4/2014 |
| CN | 103003810 B | 2/2016 |
| EP | 773490 | 5/1997 |
| EP | 795809 | 9/1997 |
| EP | 0977200 A1 | 2/2000 |
| EP | 1016960 | 7/2000 |
| EP | 1087323 | 3/2001 |
| EP | 1125617 | 8/2001 |
| EP | 1225767 | 7/2002 |
| EP | 1501614 | 2/2005 |
| EP | 2251869 | 11/2010 |
| EP | 2280545 | 2/2011 |
| EP | 2323095 | 5/2011 |
| GB | 2325543 | 11/1998 |
| GB | 2445427 | 7/2008 |
| IN | 242014 | 6/2014 |
| JP | 63232725 | 9/1988 |
| JP | H05-501942 | 4/1993 |
| JP | 8149451 | 6/1996 |
| JP | H09-065289 | 3/1997 |
| JP | 9244886 | 9/1997 |
| JP | 9305399 | 11/1997 |
| JP | 9326777 | 12/1997 |
| JP | H10-056633 | 2/1998 |
| JP | 10108161 | 4/1998 |
| JP | 10133955 | 5/1998 |
| JP | 10222428 | 8/1998 |
| JP | H09-090518 | 10/1998 |
| JP | H10-328416 | 12/1998 |
| JP | 10069511 | 3/1999 |
| JP | 11143719 | 5/1999 |
| JP | 11234326 | 8/1999 |
| JP | 2000020795 | 1/2000 |
| JP | 2000124939 | 4/2000 |
| JP | 3079208 | 6/2000 |
| JP | 2000157724 | 6/2000 |
| JP | 2000-201343 | 7/2000 |
| JP | 2000227919 | 8/2000 |
| JP | 2000-093664 | 10/2000 |
| JP | 2000298689 | 10/2000 |
| JP | 2001-024611 | 1/2001 |
| JP | 2001169246 | 6/2001 |
| JP | 2001187273 | 7/2001 |
| JP | 2001-222762 | 8/2001 |
| JP | 2001314657 | 11/2001 |
| JP | 2002-002109 | 1/2002 |
| JP | 2002-011251 | 1/2002 |
| JP | 2002011251 | 1/2002 |
| JP | 2002-516435 | 6/2002 |
| JP | 2002-202982 | 7/2002 |
| JP | 2002-319226 | 10/2002 |
| JP | 2002-335509 | 11/2002 |
| JP | 2003-124829 | 4/2003 |

(56) References Cited

FOREIGN PATENT DOCUMENTS

| | | |
|---|---|---|
| JP | 2003-167810 | 6/2003 |
| JP | 2003-204576 | 7/2003 |
| JP | 2003-524349 | 8/2003 |
| JP | 2005-123782 | 5/2005 |
| JP | 2005-518560 | 6/2005 |
| JP | 2005-210752 | 8/2005 |
| JP | 2005-274992 | 10/2005 |
| JP | 2006-503449 | 1/2006 |
| JP | 2006-203507 | 8/2006 |
| JP | 2007-219178 | 8/2007 |
| JP | 2007-525122 | 8/2007 |
| JP | 4160960 | 7/2008 |
| JP | 4165686 | 8/2008 |
| JP | 2010-266865 | 1/2010 |
| JP | 2013-016189 | 1/2013 |
| JP | 5209135 | 3/2013 |
| JP | 5518568 | 4/2014 |
| KR | 1998030143 | 7/1998 |
| KR | 1998033266 | 7/1998 |
| KR | 20000060715 | 10/2000 |
| KR | 10-2002-0062595 | 7/2002 |
| KR | 10-2006-0034292 | 4/2006 |
| KR | 10-0570458 | 4/2006 |
| KR | 10-2013-0121687 | 11/2013 |
| KR | 101494479 B1 | 2/2015 |
| RU | 2384981 C2 | 3/2010 |
| RU | 2389067 C2 | 5/2010 |
| RU | 2012155840 A | 6/2014 |
| RU | 2579945 C2 | 4/2016 |
| WO | 9103112 | 3/1991 |
| WO | 9634356 | 10/1996 |
| WO | 9849620 | 5/1998 |
| WO | 9844424 | 10/1998 |
| WO | 0005854 | 2/2000 |
| WO | 0027106 | 5/2000 |
| WO | 0063860 | 10/2000 |
| WO | 0068864 | 11/2000 |
| WO | 0163929 | 8/2001 |
| WO | 0182678 | 11/2001 |
| WO | 0201333 | 1/2002 |
| WO | 0205112 | 1/2002 |
| WO | 0235769 | 5/2002 |
| WO | 0201333 A3 | 1/2003 |
| WO | 03063990 | 8/2003 |
| WO | 03071537 | 8/2003 |
| WO | 2004063843 | 7/2004 |
| WO | 2005006608 | 1/2005 |
| WO | 2005088466 | 9/2005 |
| WO | WO2007096602 | 8/2007 |
| WO | 2008154418 | 12/2008 |
| WO | 2011149560 | 12/2011 |

OTHER PUBLICATIONS

"Brief for Appellee", In re Masayuki Chatani et al., U.S. Court of Appeals for the Federal Circuit (2007-1150) (May 21, 2007).
"How Network Load Balancing Technology Works", Microsoft TechNet, Mar. 28, 2003, 2007 Microsoft Corporation, http://technet2.microsoft.com/windowsserver/en/library/1611 cae3-5865-4897-a186-7 . . . .
"Image:TCP State diagram.jpg", Wikipedia, the free encyclopedia, Publication date unknown/ Accessed Jun. 4, 2007, http://en.wikipedia.org/wiki/IMage:TCP_state_diagram.jpg.
"In Re Masayuki Chatani and Glen Van Datta", U.S. Court of Appeals for the Federal Circuit, 2007-1150 (U.S. Appl. No. 10/221,128), Nov. 19, 2007.
"Multicast over TCP/IP HOWTO: Multicast Transport Protocols.", Mar. 20, 1998, http://www.tldp.org/HOWTO/Multicast-HOWTO-9.html.
"Petition for Panel Rehearing," In Re Masayuki Chatani and Glen Van Datta, Appeal From the United States Patent and Trademark Office, Board of Patent Appeals and Interferences, in the United States Court of Appeals for the Federal Circuit, 2007-1150 (U.S. Appl. No. 10/211,128), Jan. 3, 2008.
"Reliable User Datagram Protocol", Wikipedia, the free encyclopedia, Publication date unknown/ Accessed Jun. 4, 2007, http://en.wikipedia.org/wiki/Reliable_User_Datagram_Protocol.
"Reply Brief of Appellants", In re Masayuki Chatani et al., U.S. Court of Appeals for the Federal Circuit (2007-1150) (Jun. 4, 2007).
"Streaming Media", Wikipedia, the free encyclopedia, Publication date unknown/ Accessed Jun. 4, 2007, http://en.wikipedia.org/wiki/Streaming_media#Protocol_issues.
"Transmission Control Protocol", Wikipedia, the free encyclopedia, Publication Date unknown/ Accessed Jun. 4, 2007, http://en.wikipedia.org/wiki/Transmission_Control_Protocol#Ordered_data_transfer.2C_Retransmission_of_lost_packets_.26_Discarding_duplicat.
"User Datagram Protocol", Wikipedia, the free encyclopedia, Publication date unknown/ Accessed Jun. 4, 2007, http://en.wikipedia.org/wiki/User_Datagram_Protocol#Difference_between_TCP_and_UDP.
Adya et al., "A Multi-Radio Unification Protocol for IEEE 802.11 Wireless Networks", Microsoft Technical Report MSR-RT-2003-44, Jul. 2003.
Aronson, "Using Groupings for Networked Gaming", Gamasutra.com, Jun. 21, 2000.
Allen, Arthur D., "Optimal Delivery of Multi-Media Content over Networks", Burst.com Inc., Mar. 15, 2001, San Francisco, CA, USA.
Bahl et al., "SSCH: Slotted Seeded Channel Hopping for Capacity Improvement in IEEE 802.11 Ad-Hoc Wireless Networks", ACM MobiCom, Philadelphia, PA, Sep. 2004.
Boulic et al., "Integration of Motion Control Techniques for Virtual Human and Avatar Real-time Animation", Swiss Federal Institute of Technology, Lausanne, Switzerland, Sep. 1997.
Carter et al., "An Efficient Implementation of Interactive Video-on-Demand," Proc. of the 8th Intl. Symp. on Modeling, Analysis & Simulation etc., IEEE, 2000.
Cavin et al., "On the Accuracy of MANET Simulators", ACM, Toulouse, France, Oct. 2002.
Chin et al., "Implementation Experience with MANET Routing Protocols", ACM SIGCOMM, Nov. 2002.
Chiueh, Tzi-cker, "Distributed Systems Support for Networked Games," Computer Science Department, State University of new york at Stony Brook, Stony Brook, NY, May 1997.
Cisco Systems, Inc., "Network Flow Management: Resource Reservation for Multimedia Flows", Mar. 19, 1999.
Corson, et al., "Internet-Based Mobile Ad Hoc networking", IEEE Internet Computing, 1999.
Diot et al., "Adistributed Architecture for Multiplayer Interactive Applications on the Internet," IEEE vol. 13, Issue 4, Aug. 1999.
Draves et al. "Comparison of Routing Metrics for Static Multi-Hop Wireless Networks", ACM SIGCOMM, Portland, OR, Aug. 2004.
Draves et al., "Routing in Multi-Radio, Multi-Hop Wireless Mesh Networks", ACM MobiCom, Phialdelphia, PA, Sep. 2004.
European Search Report for EP 03 72 1413, Jun. 30, 2005.
F. Audet, NAT Behavioral Requirements for Unicast UDP, BEHAVE Internet-Draft, Jul. 15, 2005.
Festa et al., "Netscape Alumni to Launch P2P Company", Aug. 2, 2001.
Gelman et al., "A Store and Forward Architecture for Video-on-Demand Service," Proc. IEEE ICC, IEEE Press; Piscataway, N.J., 1991, pp. 27.3.1-27.3.5.
Hagsand O: "Interactive Multiuser Ves in the DIVE System", IEEE Multimedia, IEEE Service Center, New York, NY, US vol. 3, No. 1, Mar. 21, 1996, pp. 30-39, XP000582951 ISSN:1070-986X.
Hanada, "The Design of Network Game and DirecPlay", Inside Windows, Softbank K.K., vol. 4, No. 4, pp. 42-57, Apr. 1, 1998.
Holland, et al., "A Rate-Adaptive MAC Protocol for Multi-Hop Wireless Networks", ACM MobiCom 2001, Rome, Italy, Jul. 2001.
Hua et al., "Patching: A Multicast Technique for True Video-on-Demand Services," Proceedings of the ACM Multimedia 98, Sep. 12, 1998, pp. 191-200.

(56) References Cited

OTHER PUBLICATIONS

Rosenberg, Interactive Connectivity Establishment (ICE); A Methodology for Network Address Translator (NAT) Traversal for Multimedia Session Establishment Protocols, Mmusic Internet-Draft, Oct. 25, 2004.
Rosenberg, Interactive Connectivity Establishment (ICE); A Methodology for Network Address Translator (NAT) Traversal for Offer/Answer Protocols, Mmusic Internet-Draft, Jan. 16, 2007.
Rosenberg, Interactive Connectivity Establishment (ICE); A Methodology for Network Address Translator (NAT) Traversal for Offer/Answer Protocols, Mmusic Internet-Draft, Jul. 17, 2005.
Rosenberg, Simple Traversal of UDP Through Network Address Translators (NAT), BEHAVE Internet-Draft, Jul. 17, 2005.
Rosenberg, STUN—Simple Traversal of User Datagram Protocols (UDP) Through Network Address Translators (NATs), Network Working Group, Mar. 2003.
Rosenberg, Traversal Using Relay NAT (TURN), MIDCOM Internet-Draft, Oct. 20, 2003.
Rosenberg, Interactive Connectivity Establishment (ICE):A Methodology for Network Address Translator (NAT) Traversal for Multimedia Session Establishment Protocols, Mmusic Internet-Draft, Jul. 19, 2004.
Jain et al., "Impact of Interference on Multi-hop Wireless Network Performance", ACM MobiCom, San Diego, CA, Sep. 2003.
Reimer, J., "Cross-Platform Game Development and the next Generation of Consoles," Nov. 7, 2005, Ars Technica LLC.
Jones, "The Microsoft Interactive TV System: An Experience Report," Technical Report MSR-TR-97-18, Jul. 1997.
Kooser, "The Mesh Pit: Taking Wireless Networks to the Next Level", Entrepreneur Magazine, May 2004.
Kramer et al., "Tutorial: Mobile Software Agents for Bynamic Routing", MIT Lab, Mar. 1999.
Leuf, Bo, "Peer to Peer Collaboration and Sharing Over the Internet", Pearson education, Inc., Boston Massachusetts, pp. 3-73 and 213-288.
Packethop, Inc., "Connectivity that Moves You: PacketHop Mobile Mesh Networking", Belmont, California, Copyright 2003.
Pinho et al.; GloVE: A Distributed Environment for Low Cost Scalable VoD Systems; Oct. 28-30, 2002; IEEE; Proceedings of the 14th Symposium on Computer Architecture and High Performance Computing.
Qiu et al., "Optimizing the Placement of Integration Points in Multi-Hop Wireless Networks", IEEE ICNP 2004.
Office actions mailed Jan. 27, 2005, Jul. 13, 2005, Dec. 29, 2005, May 4, 2006, Jan. 3, 2007 and Jun. 19, 2007 in U.S. Appl. No. 09/765,593, filed Jan. 22, 2001.
Office actions mailed Jun. 22, 2009 and Jun. 22, 2011 in U.S. Appl. No. 12/229,281, filed Aug. 20, 2008.
Office actions mailed Feb. 13, 2008 and Jan. 7, 2009 in U.S. Appl. No. 11/355,327, filed Feb. 15, 2006.
Office actions mailed Feb. 6, 2008 and Jan. 6, 2009 in U.S. Appl. No. 11/367,174, filed Mar. 3, 2006.
Office actions mailed Aug. 8, 2006, Feb. 9, 2007, Aug. 27, 2007, Mar. 31, 2009 and Nov. 27, 2009 in U.S. Appl. 10/359,359, filed Feb. 4, 2003.
Office actions mailed Feb. 21, 2008 and Dec. 3, 2008, in U.S. Appl. No. 11/067,100, filed Feb. 25, 2005.
Office actions mailed Oct. 24, 2006, Mar. 2, 2007, Jul. 3, 2007 and Apr. 8, 2008, in U.S. Appl. No. 11/375,526, filed Mar. 13, 2006.
Office actions mailed Jun. 25, 2009, Oct. 24, 2006, Mar. 5, 2007, Jul. 3, 2007, Apr. 9, 2008 and Apr. 1, 2010, in U.S. Appl. No. 11/403,623, filed Apr. 13, 2006.
Office Action mailed Mar. 30, 2009, in U.S. Appl. No. 12/011,903, filed Jan. 29, 2008.
Office Action mailed Jun. 24, 2010, in U.S. Appl. No. 12/049,954, filed Mar. 17, 2008.
Office actions mailed Sep. 24, 2009 and Dec. 1, 2009, in U.S. Appl. No. 12/341,212, filed Dec. 22, 2008.
Office actions mailed Mar. 27, 2008, Nov. 12, 2008, May 11, 2009, Nov. 9, 2009, Mar. 8, 2011, and Jul. 13, 2011 in U.S. Appl. No. 10/717,176, filed Nov. 19, 2003.
Office Action mailed Feb. 25, 2009, in U.S. Appl. No. 12/218,591, filed Jul. 15, 2008.
Office Action mailed Sep. 22, 2010, in U.S. Appl. No. 12/218,579, filed Jul. 15, 2008.
Office actions mailed Oct. 2, 2009 and Feb. 1, 2010, in U.S. Appl. No. 12/218,581, filed Jul. 15, 2008.
Office Action mailed Apr. 15, 2010, in U.S. Appl. No. 12/235,438, filed Sep. 22, 2008.
Office actions mailed Sep. 4, 2008, Feb. 20, 2009 and Jul. 12, 2011, in U.S. Appl. No. 11/479,829, filed Jun. 30, 2006.
Office Action mailed Aug. 17, 2011, in U.S. Appl. No. 12/465,280, filed May 13, 2009.
Office Action mailed Jun. 23, 2010, in U.S. Appl. No. 12/534,765, filed Aug. 3, 2009.
Office actions mailed Feb. 9, 2011 and Jul. 20, 2011, in U.S. Appl. No. 12/717,108, filed Mar. 3, 2010.
Office Action mailed Mar. 16, 2011, in U.S. Appl. No. 12/854,046, filed Aug. 10, 2010.
Office actions mailed Nov. 12, 2010 and Jan. 20, 2011, in U.S. Appl. No. 12/839,306, filed Jul. 19, 2010.
Office Action mailed Nov. 12, 2010, in U.S. Appl. No. 12/839,311, filed Jul. 19, 2010.
Office actions mailed Dec. 3, 2010 and May 16, 2011, in U.S. Appl. No. 12/840,977, filed Jul. 21, 2010.
Qiu et al., "Troubleshooting Multihop Wireless Networks", Microsoft Technical Report, Microsoft Research-TR-2004-1, Nov. 2001.
Pike, R. et al., "Plan 9 from Bell Labs", Bell Laboratories, Murray Hill, New Jersey, USA.
Shareaza; May 27, 2003.
Tran et al.; ZIGZAG: An Efficient Peer-to-Peer Scheme for Media Streaming; Mar. 30-Apr. 3, 2003.
University of Rochester, "Computer Networks—Introduction", CSC 257/457 (Fall 2002), Sep. 9, 2002.
Wattenhofer et al., "Distributed Topology Control for Power Efficient Operation in Multihop Wireless Ad Hoc Networks," IEEE INFOCOM 2001.
White et al. "How Computers Work", Oct. 2003, Que, 7th Edition.
Takeda, Y., Symmetric NAT Traversal Using STUN, Internet engineering Task Force, Jun. 2003.
Cardelinini et al., "Efficient Provisioning of Service Level Agreements for Service Oriented Applications" Dipartimento di Informatica, Sistemi e Produzione, University of Roma, IW-SOSWE, Sep. 3, 2007, Dubrovnik Croatiia.
Raman, "Contracting over the Quality Aspect of Security in Software Products Markets," Institute for Law and Informatics, University of Lapland, QoP '06, Oct. 30, 2006. Alexandria, Virginia.
Jamieson et al. "A Metric Evaluation of Game Application software". Oct. 13-15, 2005, Submitted to The Future Play Conference, Michigan State University MI, pp. 1-8.
Carrington et al. "How Well Can Simple Metrics Represent the Performance of HPC Applications?" Nov. 2005 IEEE computer Society, 13 pages.
European Search Report in EP 02250090.4 mailed Nov. 5, 2005.
1st Communication from Examining Department in EP 02250090.4 mailed Nov. 21, 2006.
2nd Communication from Examining Department in EP 02250090.4 mailed Dec. 17, 2010.
European Search Report in EP 10012168.0 mailed Dec. 29, 2010.
European Search Report in EP 10005039.2 mailed Aug. 23, 2010.
European Search Report in EP 10011799.3 mailed Feb. 4, 2011.
International Search Report for PCT/US2011/021420 mailed Mar. 9, 2011.
Notification re: Formal Exam for RU2012155840 /08(088394) mailed Mar. 17, 2013.
Decision to Grant/Notice of Allowance mailed Apr. 1, 2014 in JP 2010110842 filed May 13, 2010.
Notification of First Office Action for CN 02102091.4 mailed Apr. 15, 2005.
Decision to Grant for CN 02102091.4 mailed Jan. 22, 2007.

(56) References Cited

OTHER PUBLICATIONS

Rejection for JP 2002-002109 mailed May 24, 2005.
Rejection for JP 2002-002109 mailed Jul. 25, 2006.
Rejection for JP 2002-002109 mailed Mar. 13, 2007.
Rejection for JP 2002-002109 mailed Apr. 8, 2008.
Notice of Allowance for JP 2002-002109 mailed Jul. 1, 2009.
Notification of First Rejection for KR 10-2002-0003520 mailed Feb. 16, 2005.
Notification of Rejection for KR 10-2002-0003520 mailed Aug. 22, 2005.
Rejection for JP 2005-061185 mailed Feb. 20, 2007.
Rejection for JP 2005-061185 mailed Apr. 8, 2008.
Intention to Grant for JP 2005-061185 mailed Jun. 24, 2008.
Rejection for KR 10-2010-0044919 mailed Sep. 30, 2013.
Rejection for JP 2010-110842 mailed Dec. 18, 2012.
Rejection for JP 2010-110842 mailed Dec. 10, 2013.
Rejection for CN 201010178544.9 mailed Dec. 2, 2011.
Rejection for CN 201010178544.9 mailed Sep. 26, 2012.
Rejection for JP 2010-256247 mailed Mar. 27, 2012.
Rejection for JP 2010-256247 mailed Jul. 12, 2012.
Rejection for JP 2012-189794 mailed Nov. 6, 2012.
Decision to Grant for JP 2012-189794 mailed Feb. 19, 2013.
Notification of Second Office Action for CN 02102091.4 mailed May 12, 2006.
Notification of Third Office Action for CN 02102091.4 mailed Oct. 13, 2006.
Rejection for KR 10-2010-0044919 mailed Apr. 30, 2014.
Rule 109/110 Communication in EP 03705879.9 mailed Sep. 7, 2004.
1st Communication from the Examining Division in EP 03705879.9 mailed Mar. 21, 2007.
2nd Communication from the Examining Division in EP 03705879.9 mailed Dec. 22, 2010.
International Search Report for PCT/US03/01968 mailed Oct. 21, 2003.
TIS Committee, "Tool Interface Standard (TIS) Portable Formats Specification Version 1.1: Executable and Linkable Format (ELF)," Oct. 1993.
The Santa Cruz Operation, "System V Application Binary Interface: MIPS RISC Processor Supplement 3rd Edition," Feb. 1996.
Anderson, David, "MIPS Mdebugging Information Version 2," Mar. 7, 1996.
AA, Oct. 5, 2005, U.S. Appl. No. 09/765,593, filed Jan. 22, 2001.
OA, Oct. 5, 2006, U.S. Appl. No. 10/059,837, filed Jan. 28, 2002.
OA, Feb. 12, 2007, U.S. Appl. No. 10/059,837, filed Jan. 28, 2002.
OA, Aug. 3, 2007, U.S. Appl. No. 10/059,837, filed Jan. 28, 2002.
AA, Oct. 19, 2007, U.S. Appl. No. 09/765,593, filed Jan. 22, 2001.
FOA, Jan. 24, 2008, U.S. Appl. No. 10/059,837, filed Jan. 28, 2002.
OA, Feb. 24, 2009, U.S. Appl. No. 11/147,858, filed Jun. 7, 2005.
OA, Jun. 25, 2009, U.S. Appl. No. 11/251,293, filed Oct. 14, 2005.
OA, Jul. 23, 2009, U.S. Appl. No. 12/109,286, filed Apr. 24, 2008.
FOA, Aug. 18, 2009, U.S. Appl. No. 11/147,858, filed Jun. 7, 2005.
OA, Sep. 24, 2009, U.S. Appl. No. 12/341,212, filed Dec. 22, 2008.
OA, Oct. 2, 2009, U.S. Appl. No. 12/341,187, filed Dec. 22, 2008.
AA, Oct. 14, 2009, U.S. Appl. No. 11/147,858, filed Jun. 7, 2005.
NOA, Dec. 1, 2009, U.S. Appl. No. 12/341,212, filed Dec. 22, 2008.
FOA, Dec. 29, 2009, U.S. Appl. No. 11/251,293, filed Oct. 14, 2005.
FOA, Jan. 25, 2010, U.S. Appl. No. 12/229,281, filed Aug. 20, 2008.
FOA, Feb. 1, 2010, U.S. Appl. No. 12/109,286, filed Apr. 24, 2008.
AA, Jun. 10, 2010, U.S. Appl. No. 11/251,293, filed Oct. 14, 2005.
AA, Jun. 28, 2010, U.S. Appl. No. 12/229,281, filed Aug. 20, 2008.
FOA, Oct. 25, 2011, U.S. Appl. No. 12/229,281, filed Aug. 20, 2008.
NOA, Nov. 3, 2011, U.S. Appl. No. 12/690,051, filed Jan. 19, 2010.
FOA, Nov. 4, 2011, U.S. Appl. No. 10/717,176, filed Nov. 19, 2003.
NOA, Jan. 17, 2012, U.S. Appl. No. 12/690,051, filed Jan. 19, 2010.
FOA, Feb. 9, 2012, U.S. Appl. No. 12/465,280, filed May 13, 2009.
OA, Mar. 14, 2012, U.S. Appl. No. 12/786,338, filed May 24, 2010.
NOA, Mar. 27, 2012, U.S. Appl. No. 10/717,176, filed Nov. 19, 2003.
FOA, Sep. 12, 2012, U.S. Appl. No. 12/786,338, filed May 24, 2010.
NOA, Jan. 31, 2013, U.S. Appl. No. 12/786,338, filed May 24, 2010.
NOA, Mar. 14, 2013, U.S. Appl. No. 09/765,593, filed Jan. 22, 2001.
OA, Jan. 15, 2014, U.S. Appl. No. 12/229,281, filed Aug. 20, 2008.
FOA, Apr. 29, 2014, U.S. Appl. No. 12/229,281, filed Aug. 20, 2008.
Notice of Allowance for KR 10-2010-0044919 mailed Nov. 24, 2014.
Rejection for CN 201180035413.8 mailed Nov. 2, 2014.
Office Action for RU2012155840 mailed Apr. 8, 2015.
Office Action for EP10005039.2 mailed Jul. 22, 2015.
Office Action for 201180035413.8 mailed Jul. 7, 2015.
Notice of Allowance for CN 201180035413.8 mailed Dec. 15, 2015.
Office Action for EP10012168.0 mailed Mar. 31, 2016.
Summons for EP100050392 mailed Jan. 20, 2016.
Notice of Allowance for EP 02250090.4 mailed Apr. 28, 2016.
Office Action mailed Jun. 9, 2016 in Korean Patent Application 10-2012-7032498 filed Jan. 14, 2011.

\* cited by examiner

| CACHE ENTRY | KEY ADDRESS | TRANSLATION ADDRESS |
|---|---|---|
| # 1 | Target 0x1000 | Host 0x2000 |
| # 2 | Target 0x1010 | Host 0x2040 |
| # 3 | Target 0x1020 | Host 0x2100 |
| ... | ... | ... |

FIGURE 3

| CACHE ENTRY | KEY ADDRESS | PIPELINE SIGNATURE | TRANSLATION ADDRESS |
|---|---|---|---|
| # 1.0 | Target 0x1000 | A | Host 0x2000 |
| # 1.1 | * | B | Host 0x2040 |
| # 2.0 | Target 0x1010 | C | Host 0x2060 |
| # 2.1 | * | D | Host 0x2090 |
| # 2.2 | * | E | Host 0x2100 |
| # 3.0 | Target 0x1020 | F | Host 0x2230 |
| ... | ... | ... | ... |

FIGURE 4

| PPU REGISTER | EMULATED REGISTER |
|---|---|
| GPR0 | VID[0] |
| GPR1 | VID[1] |
| GPR2 | VID[2] |
| GPR3 | VID[3] |
| VPR0 | MAC[0] |
| VPR1 | MAC[1] |
| VPR2 | MAC[2] |
| VPR3 | MAC[3] |
| VPR4 | CLIP[0] |
| VPR5 | CLIP[1] |
| VPR6 | CLIP[2] |
| VPR7 | CLIP[3] |
| VPR8 | NextQ |

FIGURE 6

SIMPLIFIED RUN-TIME PROGRAM TRANSLATION FOR EMULATING COMPLEX PROCESSOR PIPELINES

CROSS-REFERENCE TO RELATED APPLICATIONS

The present application claims the priority benefit of U.S. provisional patent application No. 60/973,994 filed Sep. 20, 2007 and entitled "Simplified Run-Time Program Translation for Emulating Complex Processor Pipelines," the disclosure of which is incorporated herein by reference.

This application is related to Patent Cooperation Treaty application number PCT/GB2007/000587 filed Feb. 19, 2007 in the name of Sony Computer Entertainment Inc., the disclosure of which is incorporated herein by reference.

BACKGROUND OF THE INVENTION

1. Field of the Invention

The present invention generally relates to complex processor pipelines. More specifically, the present invention relates to microcode implementation of run-time program translation for emulating said pipelines.

2. Description of the Related Art

A processor pipeline is a whole processing task or workload broken into smaller sub-tasks. Through the use of processor pipelining, instruction throughput (i.e., the number of instructions that can be executed in a unit of time) can be increased. Each sub-step of the overall task carries data at once and each sub-step is connected to a subsequent sub-step effectively creating links in a pipe.

In an elementary form, the processing of a computer instruction is split into a series of independent steps with a storage operation at the conclusion of each step. This allows control circuitry of a computing device to issue instructions at the processing rate of the slowest step. Even at the rate of the slowest step, the overall processing is still faster than the time required to perform all of the steps constituting the whole instruction at once. Pipelining in this manner allows multiple tasks to be executed in parallel. As a result, central processing units (CPU) and/or other logic units are kept as busy as possible as often as possible.

In this context, an ideal pipeline could be conceived with (for example) 50-stages and a 50 GHz clock rate that would allow for processing tasks at 50 billion times per second. Reality would dictate otherwise with respect to pipeline depth, however, as the code running in a processor must be programmed without margins for error or guesswork. The near constant calling of sub-routines or functions runs the risk of guessing a wrong branch thereby invalidating the incorrectly guessed workload, which would require the pipeline to refill completely thereby reducing performance. The possibility for increases with the number of pipeline stages.

It is, therefore, the nature of a complex pipelined processor that code execution is affected by current pipeline state. The pipeline state is dynamic and affected by previously executed code. In translating code for a complex pipelined processor, the rules of the pipeline must be followed to produce a correct translation.

The prior art has generally relied on one of two options to address the aforementioned constraints of complex pipelined processors, neither of which have resulted in significant success. The first option is to completely emulate the processor pipeline at all times. The second option is to use what is commonly referred to as a global analysis approach for an entire program to evaluate the dynamics of the program.

While the first solution is relatively simple, it generally results in reduced performance. The latter solution has the potential to increase performance of translated code but does so in the context of high implementation complexity and high translation cost. The global analysis method, too, may not be able to handle all cases and full pipeline emulation may be required as a fallback.

There is, therefore, a need in the art to simplify the microcode implementation of run-time program translation for emulating complex processor pipelines.

SUMMARY OF THE INVENTION

Embodiments of the present invention simplify the microcode implementation of run-time program translation for emulating complex processor pipelines. The disclosed embodiments offer the benefits of simple implementation, high performance, and applicability to a wide array of pipelining problems.

In a first claimed embodiment, a method for program translation in a processor pipeline is disclosed. Through this method, a current target address and pipeline signature are determined. A corresponding target address and pipeline signature entry are looked up. A translation is produced for the current target address and pipeline signature when there is no corresponding target address and pipeline signature entry.

A second claimed embodiment also provides for a method of program translation in a processor pipeline. A current target address and pipeline signature are determined. A corresponding target address and pipeline signature entry are looked up and a translation corresponding to the target address and pipeline signature are executed. This execution occurs when a corresponding target address and pipeline signature entry are available.

A third claimed embodiment recites a processor pipeline translation method. Through this method, an address pipeline signature pair is decoded and checked for a stall. A code generation function for lower and upper instructions is called and the address pipeline pair is updated.

BRIEF DESCRIPTION OF THE DRAWINGS

FIG. 3 illustrates an exemplary translation cache structure including a cache entry, key address, and translation address.

FIG. 4 illustrates an exemplary translation cache structure including a cache entry, key address, pipeline signature, and translation address.

FIG. 6 illustrates an exemplary register mapping on entry to a translated block as may occur in an embodiment of the present invention.

DETAILED DESCRIPTION

In an exemplary embodiment of the present invention, a translator statically translates a single Vector Processing Unit (VU) basic block at a time from a given Entry PC until a branch instruction—[M] bit—or end of program—[E] bit. With respect to statistical translation, each translation is based on a single VU pipeline state at the entry point. The initial pipeline state is statically driven forward one cycle at a time. Code is emitted for each instruction and the final VU pipeline state is recorded. Pipelines are not driven at runtime because the pipeline state is always known at compile time.

A pipeline state may be referred to as a pipeline signature. Translations may be saved in a cache that can be looked up by pair of entry program counter addresses of translated code blocks and a corresponding pipeline signature. This information may be representative of certain snapshots of the processor's pipeline state.

A translation cache is used to hold translated code so that the code does not have to be re-translated repeatedly. An ordinary translation cache may normally be keyed using the program counter address of translated code blocks. The present invention adds an additional key—the aforementioned pipeline signature. This signature allows one program address to correspond to multiple cached translations, each one keyed by a different pipeline signature.

Through the present invention, the problem of the dynamic pipeline state is effectively moved into the cache lookup process and leaves the code translation process to deal only with static pipeline states. With dynamic pipeline state removed from the translation process, translation becomes as simple and efficient as that for a non-pipelined processor. This method may also have applications in microprocessor design where modern processors often involve code translation form a higher-level instruction code into microcode.

Embodiments of the present invention may be implemented in the context of emulating the VU of the PlayStation®2 (as referenced with respect to FIG. 1) on another computing device such as the PlayStation®3 (as reference with respect to FIG. 2), which may not necessarily utilize the aforementioned VU. The emulation techniques referenced herein are taught in the context of a PlayStation®2 entertainment system. Notwithstanding, these techniques may be implemented in other computing environments. In this regard, any reference to emulating the VU of the PlayStation®2 vis-à-vis the PlayStation®3 or any other computing device is exemplary and solely for the purpose of illustration.

Figure 1:
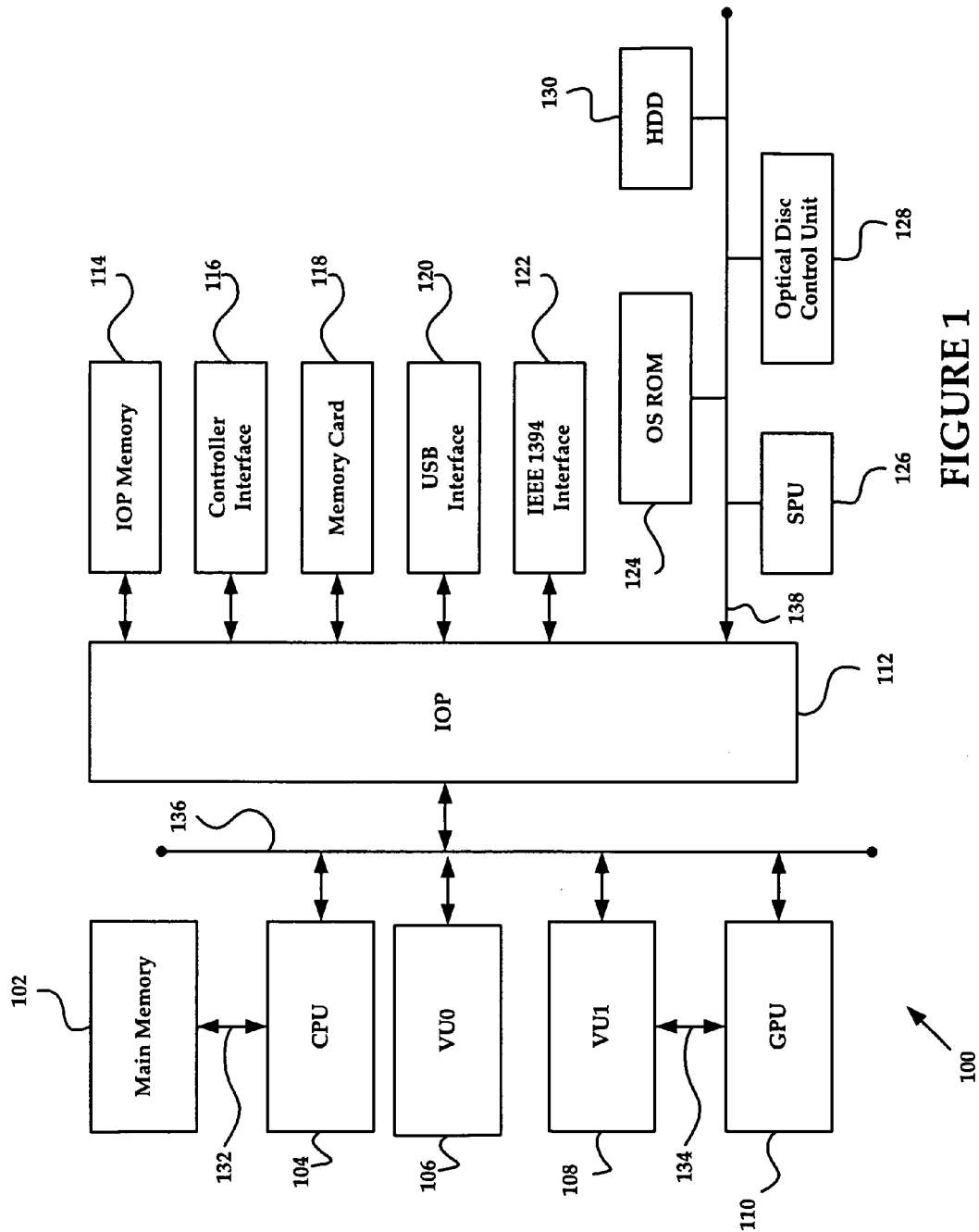
FIG. 1 is an illustration of an exemplary computing system, specifically that of the PlayStation®2 from Sony Computer Entertainment Inc.

FIG. 1 is an illustration of an exemplary computing system 100, specifically that of the PlayStation®2 from Sony Computer Entertainment Inc. The elements identified in FIG. 1 are exemplary and may include various alternatives, equivalents, or derivations thereof. The system 100 may include, but is not limited to, a main memory 102, a central processing unit (CPU) 104, vector processing units VU0 106 and VU1 108, a graphics processing unit (GPU) 110, all of which may be coupled via a bus 136 to an input/output processor (IOP) 112. The system 100 may also include an IOP memory 114, a controller interface 116, a memory card 118, a Universal Serial Bus (USB) interface 120, and an IEEE 1394 interface 122. The system 100 may further include an operating system read-only memory (OS ROM) 124, a sound processing unit (SPU) 126, an optical disc control unit 128, and a hard disc drive (HDD) 130, all of which may be connected via a bus 138 to IOP 112.

The CPU 104, the VU0 106, the VU1 108, the GPU 110, and the IOP 112 may communicate via a system bus 132. The CPU 104 may communicate with the main memory 102 via a dedicated bus 134. The VU1 108 and the GPU 110 may also communicate with one another via a dedicated bus 134.

The CPU 104 executes programs stored in the OS ROM 124 and the main memory 102. The main memory 102 may contain pre-stored programs and may also contain programs transferred via the IOP 112 from a CD-ROM, DVD-ROM, or other optical disc (not shown) using the optical disc control unit 128. The IOP 112 may be configured to control data exchanges between the CPU 104, the VU0 106, the VU1 108, the GPU 110 and other devices of the system 100, such as the controller interface 116, or from other such systems via a network adaptor (not shown).

The GPU 110 may execute drawing instructions from the CPU 104 and the VU0 106 to produce images for display on a display device (not shown). The VU1 108 may be configured to transform objects from three-dimensional coordinates to two-dimensional coordinates, and send the two-dimensional coordinates to the GPU 110. The SPU 126 may execute instructions and processes data to produce sound signals that are output on an audio device (not shown).

A user of the system 100 may provide instructions via the controller interface 116 to the CPU 104, which may be coupled to a control device including the likes of a joystick, directional buttons, and/or other control buttons. For example, the user may instruct the CPU 104 to store certain game information on the memory card 118, which may be removable (e.g., a flash memory or other non-volatile memory card), or may instruct a character in a game to perform some specified action. Other devices may be connected to the system 100 via the USB interface 120 and/or the IEEE 1394 interface 122.

The system 100 is, in one embodiment, an electronic gaming console; however, the system 100 (or portions thereof) may also be implemented as a general-purpose computer, a set-top box, a hand-held gaming device, or in a mobile device such as a cellular phone. It should further be noted that various other system architectures may be utilized within the scope of the present invention.

Figure 2:
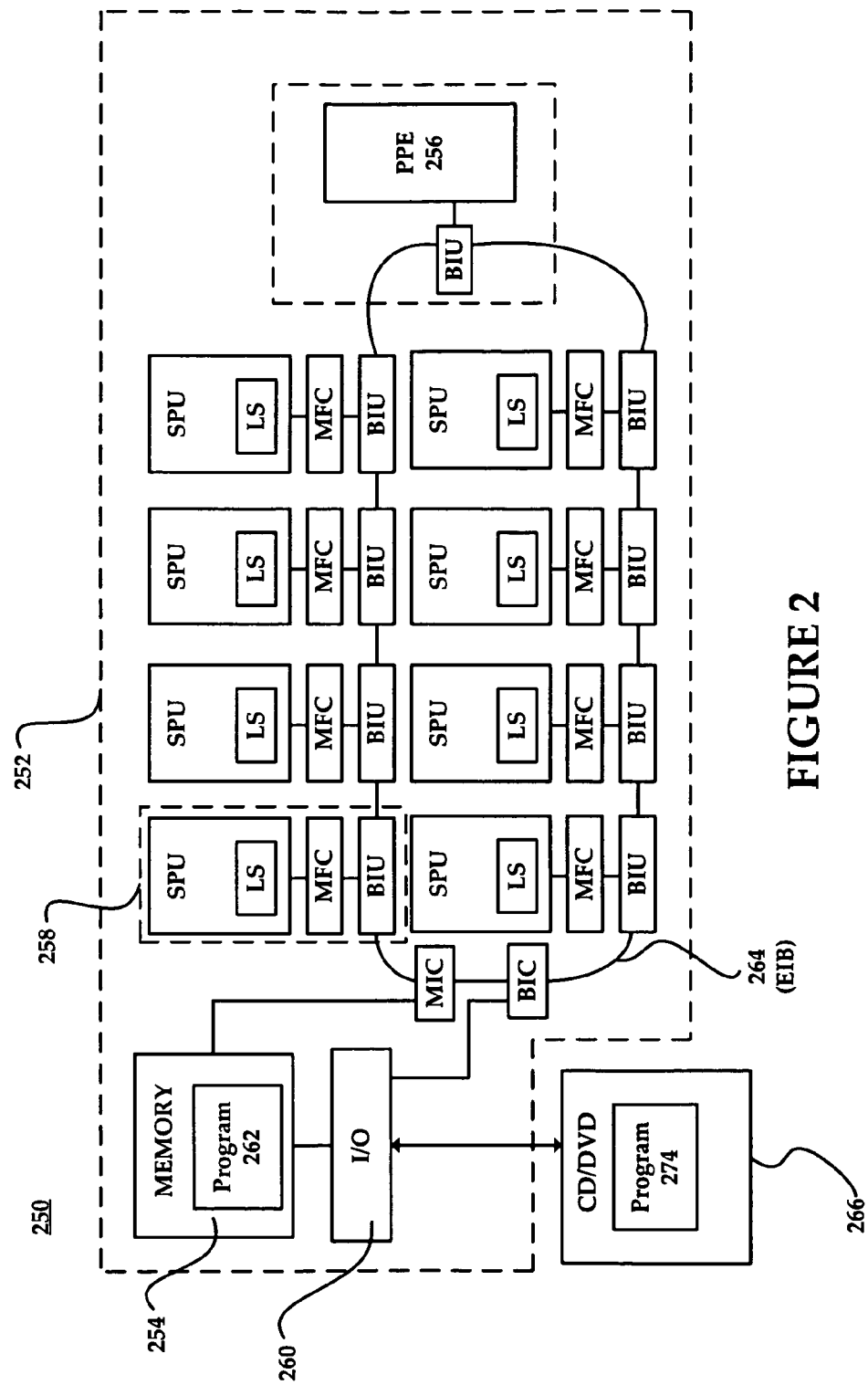
FIG. 2 is an illustration of an alternative exemplary computing system, specifically that of the PlayStation®3 from Sony Computer Entertainment Inc.

FIG. 2 is an illustration of an alternative exemplary computing system, specifically that of the PlayStation®3 from Sony Computer Entertainment Inc. The PlayStation® (3) of FIG. 2 (i.e., the electronic entertainment system 250) is based on use of a Cell processor 252. The elements identified in FIG. 2 are exemplary and may include various alternatives, equivalents, or derivations thereof. Certain aspects of a computer architecture and high speed processing model utilizing a Cell processor are disclosed in U.S. patent publication number 2002-0138637 for a "Computer Architecture and Software Cells for Broadband Networks," the disclosure of which is incorporated herein by reference. The Cell processor architecture represents the work of Sony Computer Entertainment Inc., Kabushiki Kaisha Toshiba, and International Business Machines Corporation.

Through the use of the aforementioned Cell processor, data and applications may be processed and packaged into uniquely identified and uniformly formatted software cells. The uniformity of structure and unique identification facilitates the processing of applications and data throughout a network of Cell processor equipped computing devices. For example, one computing device may formulate a software cell but can distribute that cell to another device for processing. Thus, the cells may migrate throughout a network for processing on the basis of the availability of processing resources on the network.

The cell processor 252 of FIG. 2 includes a main memory 254, a single power processor element (PPE) 256, and eight synergistic processor elements (SPE) 258. The cell processor 252 may be configured, however, with more than one PPE and any number of SPEs 258. Each SPE 258 of FIG. 2 includes a synergistic processor unit (SPU) and a local store (LS).

Main memory 254, PPE 256, and SPEs 258 may communicate with each other and with an I/O device 260 over, for example, a ring-type-element interconnect bus (EIB) 264 coupled to a bus interface controller (BIC). The PPE 256 and SPEs 258 may access the EIB 264 through bus interface units (BIU). The PPE 256 and SPEs 258 may access the main memory 254 over the EIB 264 through memory flow controllers (MFC) and memory interface controller (MIC).

Main memory 254 may include a program 262 that implements executable instructions. The instructions may be read from a CD/ROM or other optical disc in CD/DVD reader 266 coupled to the I/O device 260, the CD/ROM or other optical disc being loaded into the reader 266. The CD/ROM, too, may comprise a program, executable instructions, or other data 274.

In some embodiments, PPE 256 may be a standard processor capable of stand-alone processing of data and applications. In operation, PPE 256 may schedule and orchestrate the processing of data and applications by SPEs 258 and the associated SPU. In one embodiment, the SPU may be a single instruction, multiple data (SIMD) processor. Under the control of PPE 256, the SPUs may process data and applications in a parallel and independent manner. MIC may control accesses by PPE 256 SPUs to data and applications in main memory 254.

Returning to FIG. 1, an exemplary VU may include thirty-two 128-bit registers, sixteen 16-bit fixed point registers, four floating-point multiply accumulate (FMAC) units, a floating point divide (FDIV) unit and a local data memory. In the case of the PlayStation® 2 of FIG. 1, which includes two VUs, the data memory for a first VU may be 4 KiB in size while the second VU may features a 16 KiB data memory. To achieve high bandwidth, the VU's data memory may be connected directly to a graphics interface (GIF) and both of the data memories can be read directly by, for example, a ten-channel director memory access (DMA) unit.

A single vector instruction may consist of four 32 bit IEEE compliant single precision floating point values, which may be distributed to the four single precision (32 bit) FMAC units for processing. The FMAC units may have an instruction latency of four cycles but a six stage pipeline allowing for a throughput of one cycle per an instruction. The FDIV unit may have a nine stage pipeline and may be configured to execute one instruction every seven cycles.

The VU, in an embodiment, is a Very Long Instruction Word (VLIW) pipelined execution processor. Because the VU is a VLIW complexly pipelined execution processor, a series of problems are presented that may require cycle-accurate pipeline emulation: (1) instruction sets with various different latencies; (2) a mixture of hazard checking as some instructions are hazard checked and some are not, which imposes the requirement of correct cycle-accurate emulation; (3) register forwarding exceptions where, under certain circumstances, input arithmetic logic unit (IALU) registers are forwarded in different ways and which may require emulating a 5-cycle deep pipeline in order to emulate IALU registers correctly; and (4) as the VU executes two instruction pipes in parallel, certain conflicts between the two pipes may arise and that alter execution behavior.

A partial list of pipeline issues that require special attention on a VU include: (1) hazard checking on vector floating point (VFP) registers as instructions may stall based on previously executed instructions; (2) a Q pipeline stall if multiple Q instructions are issued; (3) a P pipeline stall if multiple P instructions are issued as non-hazard-checked Q & P registers require delayed register updates; (4) non-hazard checked MAC & CLIP registers, which require delayed register updates; and (5) VI register forwarding to the branch pipeline requires emulating IALU write back for 5 pipeline cycles.

As noted previously, code translation for such a complex system can be approached in one of two ways: a local translation approach and a global translation approach. A local translation approach involves translating only independent, relatively small blocks of code in isolation of the rest of the program, using a Just-in-Time (JIT) requirement system. As blocks are translated in isolation, the translation must account for any possible pipeline states. As such this kind of translation requires emulating the CPU pipeline at runtime at all points in the translated code. For a processor as complex as the VU of FIG. 1, the overhead of pipeline emulation may very high and dwarf the rest of the system.

A global translation approach involves analyzing a whole program. Analysis of data-flow and pipeline states throughout a whole program can result in optimizations whereby the pipeline need not be fully emulated all of the time. This can yield much better performance than the local translation approach at the cost of a much greater degree of implementation complexity. Further, this method has a high translation time cost, has non-linear complexity, and as such has application only to small programs, and does not always yield optimal results.

Turning now to a local translation method that overcomes some of the drawbacks of the previously implemented local and global approaches, it is noted that the processor pipeline state may change at any point in program execution based on previously executed instructions. A pipeline signature is a compact way to represent the current state of VU0 pipelines—a snapshot of the pipeline state. The state of the pipeline is incorporated in the pipeline signature in a compact manner; for example, the current stage number of a pipeline, which registers cause hazards or at what cycle will a certain register value update.

For a complex CPU such as the VU of the PlayStation®2, sufficient information could be captured within a 128-bit pipeline signature. From this signature, the complete pipeline state may be deduced. The pipeline signature contains sufficient information to be able to resume correct VU0 pipeline execution at any time and to facilitate efficient translation.

The signature helps keep the translator simple while supporting all the complexity of VU0 pipelines efficiently. The pipeline signature may be made up of the following elements and, by these definitions, a pipeline signature may (and in some cases shall) occupy less than 128 bits:

Q Pipeline State (QPS) 4 bits: a Q pipeline is either idle or executing for a maximum of 13 cycles thus Q Pipeline State saves a 4 bit value for 0 to 13 cycles.

VPU Float Register History (VFR[3] [2]) 54 bits: up to two VF registers may be modified in each cycle (one by lower and one by upper pipeline). Each VF register is uniquely identified by 9 bits (5 bits for register number 0 to 31 and 4 bits mask for XYZW fields). VU pipeline may be stalled by VF register history from the past 3 cycles thus VF Register History saves 3 cycles*2 registers*9 bits.

VPU Integer Register History (VIR[4]) 16 bits and (VIS [4]) 4 bits: up to one VI register may be modified in each cycle (by lower pipeline). Each VI register is uniquely identified by 4 bits (register number 0 to 15). VU pipeline may be stalled by VI register history for the past 3 cycles. It is also necessary to cope with IALU→BRANCH hazard, which is partly addressed by keeping the register history for 4 cycles whereby VIRD saves 4 cycles*1 register*4 bits. VISD, is an extra 1 bit associated with each VIR[ ] value above that indicates if reading the VIR register causes stalls.

IALU History (IALUH) 1 bit: A 1 bit flag indicates if the last cycle executed was an IALU instruction (for IALU→BRANCH hazard).

Branch History (BH) 1 bit: A 1 bit flag indicates if the last instruction executed was a taken BRANCH (for branch-in-branch handling).

E-bit History (EH) 1 bit: A 1 bit flag indicates if E-bit was set on the last instruction (for end of program handling).

Extra Information to Aid Efficient Translation 32 bits: In one embodiment, 6 bits may be dedicated to help optimize the MAC Flag pipeline status, 6 bits to help optimize the CLIP Flag pipeline status, and 4*5 bits to help optimize the integer pipeline status.

FIG. 3 illustrates an exemplary translation cache structure including a cache entry, key address, and translation address. Normally a translation cache may be used to cache code translations. Previous translations can be looked up in the cache using a key. Generally the key may be the target program counter address, and the value may be the translation's host address as in FIG. 3. Had the target address 0x1010 been required, for example, a match would occur to translation entry #2, which would yield host address 0x2040. This system allows a one-to-one mapping of target address to host translation address.

FIG. 4 illustrates an exemplary translation cache structure including a cache entry, key address, pipeline signature, and translation address. In a Pipeline Signature cache the key is built up of both the target address and a Pipeline Signature as in FIG. 4. Had the target address 0x1001 together with Pipeline Signature 'D' been required, for example, a match would occur to translation entry #2.1 which would yield host address 0x2090. This system allows multiple entries in the cache for each target address.

With the Pipeline Signature incorporated in the cache lookup process, simplification of the translation process is possible. In FIG. 3, translation #2 must correspond to any potential pipeline state, in other words the pipeline state is dynamic on entry to translation #2 within this translation and must be translated as such. In FIG. 4, translation #2.1 corresponds to a single pipeline signature, and as such to a single pipeline state. With the pipeline state now static, translation #2.1 can be generated and optimized specifically for that single pipeline state. With the pipeline being static, the translation process is simplified and can handle all pipelining attributes, has linear complexity, and can be optimized to do a minimal amount of processing given the fixed pipeline conditions.

Figure 5:
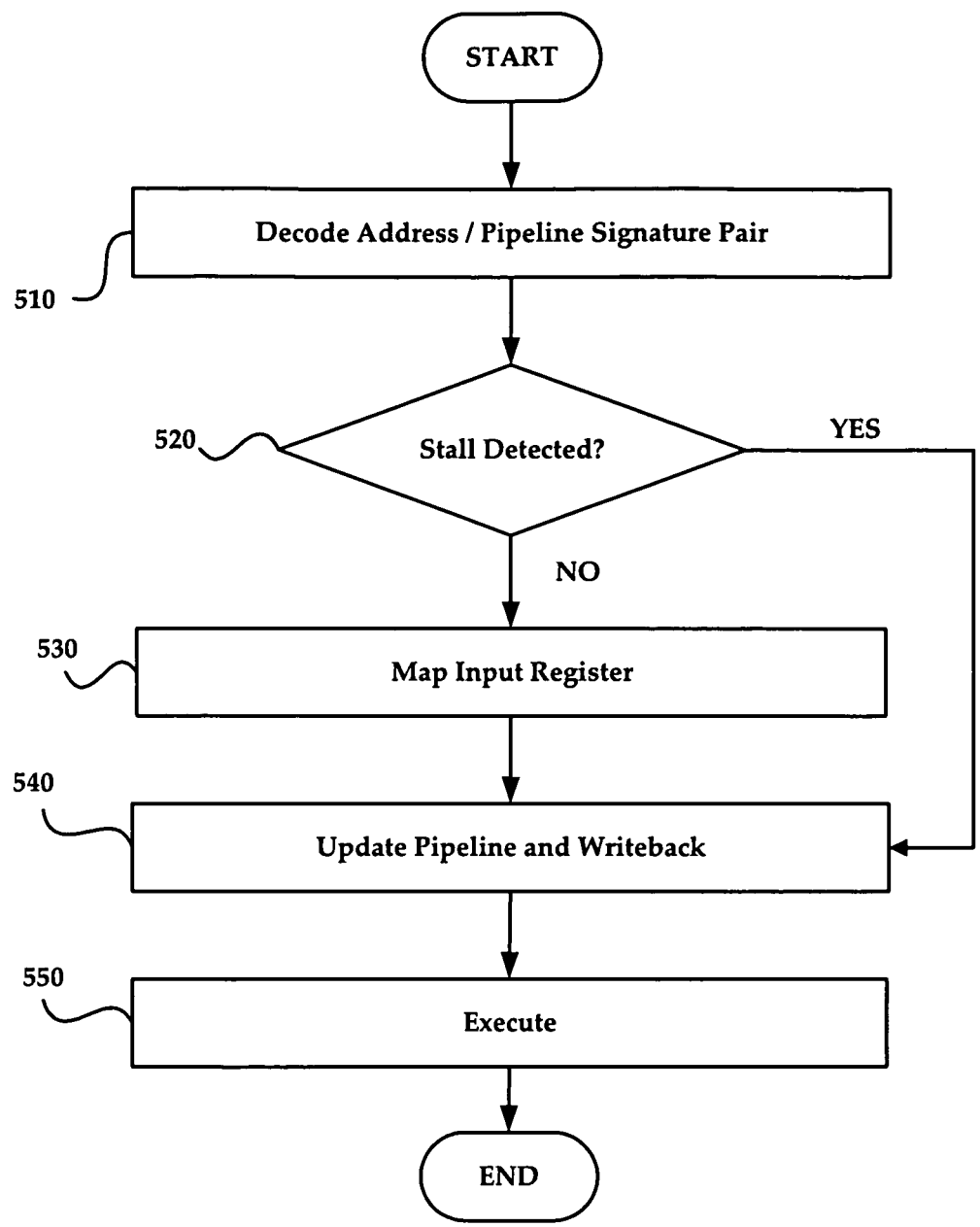
FIG. 5 illustrates an exemplary translation process as may be executed in an embodiment of the present invention.

FIG. 5 illustrates an exemplary translation process as may be executed in an embodiment of the present invention. At any point in translating or executing the target program, the current target address and pipeline signature is known. Cache entries for a corresponding target address and pipeline signature entry are looked up. This process can be most efficient if the entries are stored in a hash table.

If there is no match, a translation is produced for the current target address and pipeline signature. These are static values and the translation is valid only for the address and pipeline signature pair. This translation is saved in the translation cache and may be subsequently executed. If there is a match, this translation is likewise executed.

Wherever there are static branches in translated code, new target address and Pipeline Signature for the branch target is known statically at translation time. Since this is static a cache lookup, it need not be done at run-time. A one off lookup is needed at translation time. Whenever there are dynamic branches in translated code a cache lookup must be done at run-time. Translation at each cycle may be divided into the following steps.

Step 510 may be characterized as a decoding translation stage. At this stage, the current address pipeline signature pair is decoded, which prepares information about the instructions for step 520 and 530.

In step 520, which may be characterized as a stall determination stage, VF and VI stalls are checked using current VFRD, VIRU, and VIS[ ] information. If a stall is detected, translation skips to translation step 540.

In step 530—the register mapping and instruction generation stage—the code generation function gen_func is called for the lower and upper instructions. Control flow, next program counter and program termination may also be determined at this stage. Each gen_func maps the input registers it requires and emits computation. The result may not be conceptually written back to the register file at this time but may be kept in a temporary register and a record may be made for the write back phase. This avoids write back hazards when Upper & Lower pipe modify and/or read the same register on the same cycle.

For example, a first write back hazard may include the upper and lower pipes writing the same VF register. In response, the following is proposed: add vf01, vf00, vf00??? Iq vf01,)(vi00). A second such hazard might be the upper pipe reading the VF register that is modified by the lower pipe. In response, the following is proposed: add vf02, vf01, vf00??? Iq vf01, 0(vi00).

In some embodiments, only the lower pipe VF register write may need to be delayed to get around the write back hazards. The upper pipe may go direct to the real VF register. The lower pipe VF results may be kept in a temporary register and then re-mapped to a real VF register at step 540.

In step 540—the pipeline update and write back stage—the pipeline update and write back involves the following. First, write back VIR[0] & VID[0] to VI register file, which may be done through register re-naming. Second, write back VF registers recorded during step 530, which may be done by registered renaming in observance of a write back hazard where the upper and lower pipes writing the same VF register. Thirdly, update the MAC and CLIP flags pipeline, which may be done through register re-naming. The pipeline signature update is then complete, and translation is executed at step 550.

With respect to the aforementioned register re-naming, emulated registers may be assigned to real PPU registers during translation. Re-naming means re-assigning real PPU registers from one emulated register to another. No actual move instructions are involved. For example, VID[0] is currently stored in PPC GPR $r1. $r1 is named VID[0]. VID[1] is currently stored in PPC GPR $r2. $r2 is named VID[1]. Renaming $r2 to VID[0] is equivalent to the operation VID[0]=VID[1].

The Pipeline Signature is conceptually updated at each cycle during translation as follows using register re-naming. For example:

VIR[0]=VIR[1]; VID[0]=VID[1]; VIS[0]=VIS[1];
VIR[1]=VIR[2]; VID[1]=VID[2]; VIS[1]=VIS[2];
VIR[2]=VIR[3]; VID[2]=VID[3]; VIS[2]=VIS[3];
VIR[3]=New VI Register; VID[3]=New VI Data;
VIS[3]=1 if ILW* instruction executed, else 0;
IALUH=1 if IALU instruction executed, else 0;
BH=1 if taken BRANCH executed, else 0;

EH=1 if E-bit executed, else 0;
QPS decrements to zero; When QPS=0 the Q register updates.

With respect to VF register mapping, VF registers are not delayed, thus they are mapped direct from the VF register file.

Concerning VI Register Mapping and IALU→BRANCH Hazard, VI registers are delayed 4 cycles in VID[ ]. In some instances, if a VI register hits a VID, it is mapped direct to that VID (i.e., VID Forwarding). If a VI register misses VID it is mapped direct from the VI register file. When IALU-→BRANCH hazard is detected, VID Forwarding is skipped. IALU→BRANCH hazard is detected using IALUH and VIR[0] as follows:

II For VI register N
   if(IALUH=1 && N=VIR[0])
   Read N direct from register file VI[N]
   else
   Register N is forwarded from VID[ ]

FIG. 6 illustrates an exemplary register mapping on entry to a translated block as may occur in an embodiment of the present invention. The initial register mapping must be fixed because it is not saved in the pipeline signature. Depending upon space available in the pipeline signature, these could also be saved and then they would not have to be fixed.

Computer-readable storage media refer may be utilized to provide instructions to a processor for execution, including instructions that correspond to the methodology of FIG. 3. Various forms of transmission media may be involved in carrying one or more sequences of one or more instructions to a processor for execution.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive.

Further, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for program translation in a processor pipeline, the method comprising:
   determining a current target address and pipeline signature, the pipeline signature including a state of the processor pipeline, the pipeline signature allowing one program address to correspond to multiple cached translations, each cached translation keyed by a different pipeline signature;
   requesting a translation based at least in part on the current target address and the pipeline signature, the translation including instructions translated for a processor; and
   generating the translation when the translation is unavailable, the translation valid for only a single address and pipeline signature pair.

2. The method of claim 1, wherein the target address and pipeline signature are looked up in a hash table.

3. The method of claim 1, wherein the target address and pipeline signature are static values.

4. The method of claim 1, further comprising saving the translation in a translation cache.

5. The method of claim 4, further comprising executing the translation.

6. The method of claim 1, wherein the translation includes translating instructions to an instruction set of the processor.

7. A method for program translation in a processor pipeline, the method comprising:
   determining a current target address and pipeline signature, the pipeline signature including a state of the processor pipeline, the pipeline signature allowing one program address to correspond to multiple cached translations, each cached translation keyed by a different pipeline signature;
   requesting a translation based at least in part on the current target address and the pipeline signature, the translation including instructions translated for a processor; and
   executing the translation when the translation is unavailable, the translation valid for only a single address and pipeline signature pair.

8. The method of claim 7, wherein the target address and pipeline signature are looked up in a hash table.

9. The method of claim 7, wherein the target address and pipeline signature are static values.

10. A processor pipeline translation method, comprising:
    decoding a current target address and pipeline signature, the pipeline signature including a state of a processor pipeline, the pipeline signature allowing one program address to correspond to multiple cached translations, each cached translation keyed by a different pipeline signature;
    checking for a stall;
    calling a code generation function to translate instructions for a processor for lower and upper instructions; and
    updating an address pipeline signature pair, for which a generated translation is valid for only the address pipeline signature pair.

11. The method of claim 10, wherein the code generation function maps required input registers.

12. The method of claim 11, wherein the mapped input registers are maintained in a temporary register.

13. The method of claim 12, further comprising creating a record for a write back operation.

14. The method of claim 11, further comprising writing back the mapped input registers to a register file.

15. The method of claim 10, wherein the stall is checked with respect to VF and VI stalls.

16. The method of claim 15, wherein the stall is checked using current VFRD, VIRU, and VIS[ ] information.

* * * * *